United States Patent

Takahashi

[11] Patent Number: 5,886,824
[45] Date of Patent: Mar. 23, 1999

[54] IMAGE DISPLAY APPARATUS

[75] Inventor: Koichi Takahashi, Hachioji, Japan

[73] Assignee: Olympus Optical Co., Ltd., Tokyo, Japan

[21] Appl. No.: 906,834

[22] Filed: Aug. 6, 1997

[30] Foreign Application Priority Data

Aug. 30, 1996 [JP] Japan .................................... 8-230077

[51] Int. Cl.⁶ .................................................. G02B 27/14
[52] U.S. Cl. .......................................... 359/633; 359/631
[58] Field of Search ..................... 359/630, 631, 359/633, 637, 639

[56] References Cited

U.S. PATENT DOCUMENTS

| Re. 27,356 | 5/1972 | La Russa | 350/157 |
|---|---|---|---|
| 4,026,641 | 5/1977 | Bosserman et al. | 359/869 |
| 5,093,567 | 3/1992 | Staveley | 250/221 |
| 5,701,202 | 12/1997 | Takahashi | 359/631 |
| 5,734,505 | 3/1998 | Togino et al. | 359/631 |
| 5,745,295 | 4/1998 | Takahashi | 359/631 |
| 5,751,494 | 5/1998 | Takahashi | 359/631 |

FOREIGN PATENT DOCUMENTS

| 687 932 A2 | 12/1995 | European Pat. Off. . |
|---|---|---|
| 730 183 A2 | 9/1996 | European Pat. Off. . |
| 62-214782 | 9/1987 | Japan . |
| 3-101709 | 4/1991 | Japan . |

*Primary Examiner*—Georgia Epps
*Assistant Examiner*—Ricky Mack
*Attorney, Agent, or Firm*—Pillsbury Madison & Sutro LLP

[57] ABSTRACT

An image display apparatus which enables observation of a clear image at a wide field angle with substantially no reduction in the brightness of the image, and which is extremely small in size and light in weight and hence unlikely to cause the observer to be fatigued. The apparatus includes an image display device (6) and an optical system (5) for projecting an image displayed by the image display device (6) and for leading the projected image to an observer's eyeball (7). The optical system (5) includes a first optical element (3) filled with a medium having a refractive index larger than 1. The first optical element (3) has, in the sequence of backward ray tracing, a first surface (11) serving as both a refracting surface and an internally reflecting surface; a second surface (12) which is a reflecting surface decentered or tilted with respect to an observer's visual axis (2); and a third surface (13) which is a refracting surface closest to the image display device (6). The optical system (5) further includes a second optical element (4) provided between the observer's eyeball (7) and the first optical element (3) and having two refracting surfaces. Assuming that the focal length of the second optical element (4) is $f_2$, and the focal length of the optical system (5) is $f_A$, the condition of $0.01 < f_A/f_2 < 0.3$ is satisfied.

39 Claims, 13 Drawing Sheets

FIG. 19
(PRIOR ART)
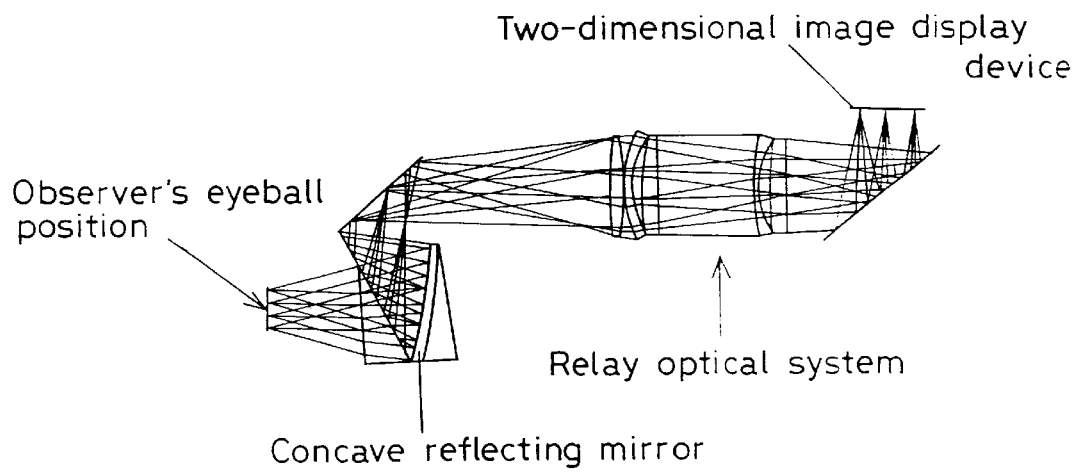
FIG.20 (a)
(PRIOR ART)
FIG.20 (b)
(PRIOR ART)
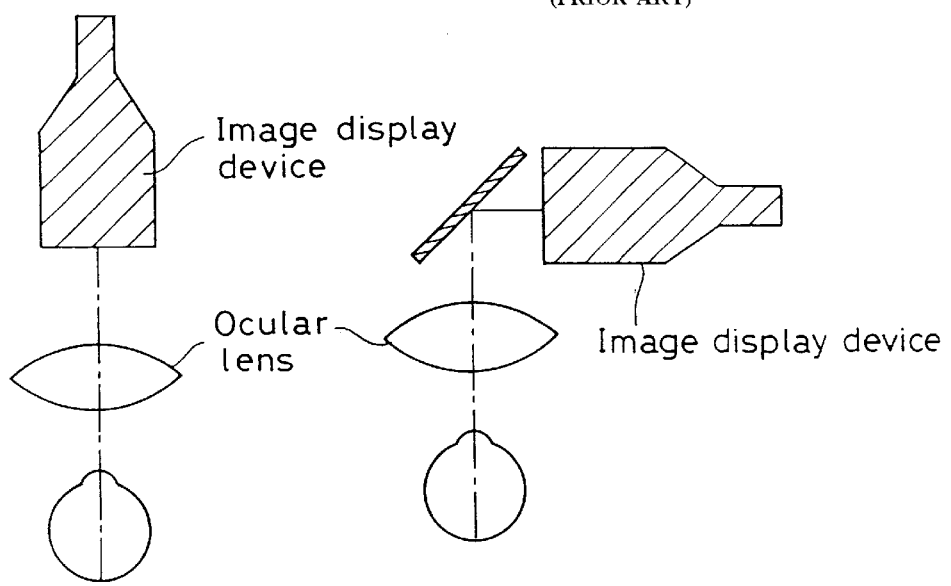

IMAGE DISPLAY APPARATUS

BACKGROUND OF THE INVENTION

The present invention relates to an image display apparatus and, more particularly, to a head- or face-mounted image display apparatus that can be retained on the observer's head or face.

As an example of conventional head- or face-mounted image display apparatus, an image display apparatus disclosed in Japanese Patent Application Unexamined Publication (KOKAI) No. 3-101709 (1991) is known. In this image display apparatus, as shown in FIG. 19, an image that is displayed by an image display device is transmitted as an aerial image by a relay optical system including a positive lens, and the aerial image is projected into an observer's eyeball as an enlarged image by an optical system formed from a concave reflecting mirror.

Japanese Patent Application Unexamined Publication (KOKAI) No. 62-214782 (1987) discloses another type of conventional image display apparatus. As shown in FIGS. 20(a) and 20(b), the conventional image display apparatus is designed to enable an image of an image display device to be directly observed as an enlarged image through an ocular lens.

U.S. Pat. No. 4,026,641 discloses another type of conventional image display apparatus. In the conventional image display apparatus, as shown in FIG. 21, an image of an image display device is transferred to a curved object surface by an image transfer device, and the image transferred to the object surface is projected in the air by a toric reflector.

U.S. Pat. No. Reissued 27,356 discloses another type of conventional image display apparatus. As shown in FIG. 22, the apparatus is an optical system designed to project an object surface on an exit pupil by a semitransparent concave mirror and a semitransparent plane mirror.

However, an image display apparatus of the type in which an image of an image display device is relayed, as in the image display apparatus shown in FIG. 19, must use several lenses as a relay optical system in addition to an optical system, regardless of the type of optical system. Consequently, the optical path length increases, and the optical system increases in both size and weight.

In a layout such as that shown in FIGS. 20(a) and 20(b), the amount to which the apparatus projects from the observer's face undesirably increases. Further, because an image display device and an illumination optical system are attached to the projecting portion of the apparatus, the apparatus becomes increasingly large in size and heavy in weight.

Because a head-mounted image display apparatus is fitted to the human body, particularly the head, if the amount to which the apparatus projects from the user's face is large, the distance from the supporting point on the head to the center of gravity of the apparatus is long. Consequently, the weight of the apparatus is imbalanced when the apparatus is fitted to the observer's head, causing the observer to be readily fatigued. Further, when the observer moves or turns with the apparatus fitted to his/her head, the apparatus may collide with something. That is, it is important for a head-mounted image display apparatus to be small in size and light in weight. An essential factor in determining the size and weight of the apparatus is the arrangement of the optical system.

However, if an ordinary magnifier alone is used as an optical system, exceedingly large aberrations are produced, and there is no device for correcting them. Even if spherical aberration can be corrected to a certain extent by forming the configuration of the concave surface of the magnifier into an aspherical surface, other aberrations such as coma and field curvature remain. Therefore, if the field angle for observation is increased, the image display apparatus becomes impractical. Alternatively, if a concave mirror alone is used as an optical system, it is necessary to use not only ordinary optical elements (lens and mirror) but also a device for correcting field curvature by an image transfer device (fiber plate) having a surface which is curved in conformity to the field curvature produced, as shown in FIG. 21.

In a coaxial optical system in which an object surface is projected on an observer's pupil by using a semitransparent concave mirror and a semitransparent plane mirror as shown in FIG. 22, because two semitransparent surfaces are used, the brightness of the image is reduced to as low a level as $1/16$, even in the case of a theoretical value.

Further, because field curvature that is produced by the semitransparent concave mirror is corrected by curving the object surface itself, it is difficult to use a flat display, e.g. an LCD (Liquid Crystal Display), as an image display device.

SUMMARY OF THE INVENTION

In view of the above-described problems of the conventional techniques, an object of the present invention is to provide an image display apparatus which enables observation of a clear image at a wide field angle with substantially no reduction in the brightness of the observation image, and which is extremely small in size and light in weight and hence unlikely to cause the observer to be fatigued.

To attain the above-described object, the present invention provides an image display apparatus including an image display device for displaying an image and an optical system for projecting the image displayed by the image display device and for leading the projected image to an observer's eyeball. The optical system includes a first optical element and a second optical element. The first optical element has at least three surfaces, and a space formed by the at least three surfaces is filled with a medium having a refractive index larger than 1. The at least three surfaces are defined as a first surface, a second surface, and a third surface, respectively, in the order in which light rays pass in backward ray tracing from the observer's eyeball to the image display device. The first surface serves as both a refracting surface and an internally reflecting surface. The second surface is a reflecting surface facing the first surface and decentered or tilted with respect to the observer's visual axis. The third surface is a refracting surface closest to the image display device. The second optical element is provided between the observer's eyeball and the first optical element and has at least two refracting surfaces. Assuming that the focal length of the second optical element is $f_2$, and the focal length of the optical system is $f_A$, the following condition is satisfied:

$$0.01 < f_A/f_2 < 0.3 \qquad (1)$$

In addition, the present invention provides an image display apparatus including an image display device for displaying an image and an optical system for projecting the image displayed by the image display device and for leading the projected image to an observer's eyeball. The optical system includes a first optical element and a second optical element. The first optical element has at least three surfaces, and a space formed by the at least three surfaces is filled with a medium having a refractive index larger than 1. The at least three surfaces are defined as a first surface, a second surface, and a third surface, respectively, in the order in which light rays pass in backward ray tracing from the observer's eyeball to the image display device. The first surface serves as both a refracting surface and an internally reflecting surface. The second surface faces the first surface and is decentered or tilted with respect to the observer's visual axis. The third surface is a refracting surface closest to the image display device. The second optical element is provided between the observer's eyeball and the first optical element and has at least two refracting surfaces. The second surface of the first optical element is a semitransparent reflecting surface that reflects a part of incident light and transmits a part of it. The first and second optical elements are disposed in series in the direction of the observer's visual axis such that the second optical element lies on the eyeball side of the first optical element, and the first optical system lies on the side of the second optical element that is remote from the eyeball. Thus, a bundle of light rays entering the optical system from an external scene (i.e. outside world) passes successively through the first optical element and the second optical element to reach the observer's eyeball.

The action and effect of each of the above-described image display apparatuses according to the present invention will be described below. The following description will be made on the basis of backward ray tracing in which light rays are traced from the observer's pupil position toward the image display device for the convenience of designing the optical system.

The first image display apparatus according to the present invention includes an image display device for displaying an image and an optical system for projecting the image displayed by the image display device and for leading the projected image to an observer's eyeball. The optical system includes a first optical element and a second optical element. The first optical element has at least three surfaces, and a space formed by the at least three surfaces is filled with a medium having a refractive index larger than 1. The at least three surfaces are defined as a first surface, a second surface, and a third surface, respectively, in the order in which light rays pass in backward ray tracing from the observer's eyeball to the image display device. The first surface serves as both a refracting surface and an internally reflecting surface. The second surface is a reflecting surface facing the first surface and decentered or tilted with respect to the observer's visual axis. The third surface is a refracting surface closest to the image display device. The second optical element is provided between the observer's eyeball and the first optical element and has at least two refracting surfaces. Assuming that the focal length of the second optical element is $f_2$, and the focal length of the optical system is $f_A$, the following condition is satisfied:

$$0.01 < f_A/f_2 < 0.3 \qquad (1)$$

Examples 1 to 7 (described later) correspond to the above-described arrangement of the image display apparatus.

In the first image display apparatus according to the present invention, coma and field curvature produced by the second surface, which is decentered or tilted with respect to the axial principal ray, can be corrected by satisfying the condition (1), thus succeeding in providing the observer with a clear observation image having a wide exit pupil diameter and a wide observation field angle.

The first image display apparatus according to the present invention will be described below in detail with reference to FIG. 1.

FIG. 1 is a sectional view of the first image display apparatus according to the present invention. In FIG. 1, reference numeral 1 denotes an observer's pupil position; 2 denotes an observer's visual axis (a part of the axial principal ray); 3 denotes a first optical element; 4 denotes a second optical element; 5 denotes an optical system; 6 denotes an image display device; 7 denotes an observer's eyeball; 11 denotes a first surface of the first optical element; 12 denotes a second surface of the first optical element; 13 denotes a third surface of the first optical element; 21 denotes a first surface of the second optical element; and 22 denotes a second surface of the second optical element.

A coordinate system is defined as follows: As shown in FIG. 1, with the observer's pupil position 1 defined as the origin, the direction of the observer's visual axis 2 is taken as a Z-axis, where the direction toward the optical system 5 from the origin is defined as a positive direction. The vertical direction (as viewed from the observer's eyeball 7) which perpendicularly intersects the observer's visual axis 2 is taken as a Y-axis, where the upward direction is defined as a positive direction. The horizontal direction (as viewed from the observer's eyeball 7) which perpendicularly intersects the observer's visual axis 2 is taken as an X-axis, where the leftward direction is defined as a positive direction. That is, the plane of FIG. 1 is defined as a YZ-plane, and a plane which is perpendicular to the plane of the figure is defined as an XZ-plane.

In this apparatus, a bundle of light rays emitted from the image display device 6 enters the first optical element 3 while being refracted by the third surface 13 of the first optical element 3. The incident light rays are internally reflected by the first surface 11 and then reflected by the second surface 12. The reflected light rays exit from the first optical element 3 while being refracted by the first surface 11, and enter the second optical element 4 while being refracted by the second surface 22 of the second optical element 4. Then, the light rays exit from the second optical element 4 while being refracted by the first surface 21, and enter the observer's eyeball 7 with the observer's iris position or eyeball rolling center as an exit pupil 1. In this way, the image of the image display device 6 is projected into one eyeball 7 of the observer as an enlarged virtual image. Thus, an observation image of wide field angle can be realized.

Concave mirrors generally have such nature that, if strong power is given to a concave surface, Petzval sum increases, and curvature of field is produced. Moreover, negative comatic aberration is produced.

In the optical system according to the present invention, the first optical element 3 is arranged such that a space formed by the first, second and third surfaces 11, 12 and 13 is filled with a medium having a refractive index larger than 1. Therefore, light rays from the pupil 1 are refracted by the first surface 11. Accordingly, it is possible to minimize the height at which extra-axial principal and subordinate rays are incident on the second surface 12. Because the height of the principal rays is low, the size of the second surface 12 is minimized, and thus the first optical element 3 can be formed in a compact structure. Alternatively, the field angle can be widened. Moreover, because the height of the subordinate rays is reduced, it is possible to minimize comatic aberrations produced by the second surface 12, particularly higher-order comatic aberrations.

However, as the field angle of an image display apparatus becomes wider and the size thereof becomes smaller, the tilt angle of the second surface 12, which is the first reflecting surface, becomes larger, and higher-order comatic aberrations produced by the second surface 12 increase. Moreover, astigmatism, which is produced by the tilt of the surface, also increases. Accordingly, it may be difficult to satisfactorily correct these aberrations by only the first optical element 3.

Therefore, the second optical element 4 is provided between the observer's eyeball 7 and the image display device 6 in addition to the above-described first optical element 3. More specifically, the second optical element 4 is disposed between the first surface 11 and the observer's eyeball 7. By doing so, it becomes possible to correct aberrations produced in the optical system even more effectively.

In the first optical element 3, the second surface 12 and the internally reflecting surface of the first surface 11, which is subsequent to the second surface 12, are reflecting surfaces. Therefore, no chromatic aberration is produced at these surfaces. Further, at the third surface 13, which lies in close proximity to the image display device 6, the principal rays are approximately parallel to the optical axis. Therefore, the third surface 13 produces minimal chromatic aberration. Consequently, chromatic aberration produced by the first surface 11, which is a refracting surface, is dominant in the optical system. In a wide-field optical system such as that in the present invention, lateral chromatic aberration appears more markedly than axial chromatic aberration. That is, it is important to correct lateral chromatic aberration produced by the first surface 11, and it is possible to display an image which is clearer and of higher resolution by correcting the lateral chromatic aberration. Accordingly, the optical system is arranged such that the first optical element 3 and the second optical element 4 having at least two refracting surfaces are provided between the observer's eyeball 7 and the image display device 6. By doing so, optical elements constituting the optical system 5 can be composed of two or more different mediums, and it becomes possible to correct the lateral chromatic aberration by virtue of the difference in Abbe's number between these mediums.

The image display apparatus can have the above-described advantageous effect of the second optical element 4 while ensuring a focal length that enables observation at a wide field angle by satisfying the following condition:

$$0.01 < f_A/f_2 < 0.3 \quad (1)$$

where $f_2$ is the focal length in the YZ-plane of the second optical element 4 defined with respect to the axial principal ray emanating from the center of the observer's pupil 1 and reaching the center of the display surface of the image display device 6, and $f_A$ is the focal length of the optical system 5.

However, in the optical system of the image display apparatus according to the present invention, each surface is decentered with respect to the axial principal ray. Therefore, the focal length cannot accurately be obtained by the ordinary paraxial ray tracing. For this reason, the focal length of the optical system is assumed to be $f_A$ that is defined by $$f_A = d/2\tan\theta$$

where d is the size of the image display device 6 in the Y-axis direction, and $\theta$ is the half-field angle in the Y-axis direction.

In the case of a wide field angle in particular, if the condition (1) is satisfied, the second optical element 4 has an appropriate positive power. Accordingly, it is possible to realize a compact and lightweight optical system. At the same time, the occurrence of comatic aberration can be suppressed very effectively. If $f_A/f_2$ is not larger than the lower limit of the condition (1), i.e. 0.01, the power of the second optical element 4 becomes excessively small, and the above-described effect of reducing the height of extra-axial rays becomes insufficient. Consequently, the size of the optical system 5 becomes undesirably large. If $f_A/f_2$ is not smaller than the upper limit, i.e. 0.3, the power of the second optical element 4 becomes excessively large. Accordingly, the first optical element 3 cannot have a sufficiently large power, and this causes the power balance of the entire optical system 5 to be destroyed. Consequently, it becomes impossible to ensure the necessary focal length for the entire system.

Unlike the conventional arrangement in which an observation image of an image display device is formed in the air as a real intermediate image by a relay optical system and this image is projected into an eyeball as an enlarged image by an ocular optical system, the first image display apparatus according to the present invention projects the image of the image display device 6 directly into the observer's eyeball 7 as an enlarged image, thereby enabling the observer to view the enlarged image of the image display device 6 as a virtual image. Accordingly, the optical system 5 can be constructed of a minimal number of optical elements.

Further, because the second surface 12 of the first optical element 3, which is a reflecting surface, is disposed immediately in front of the observer's face in a configuration conformable to the curve of his/her face, the amount to which the optical system projects from the observer's face can be reduced to an extremely small value. Thus, a compact and lightweight image display apparatus can be realized.

It is more desirable to satisfy the following condition:

$$0.02 < f_A/f_2 < 0.2 \quad (1.1)$$

where $f_2$ is the focal length of the second optical element 4, and $f_A$ is the focal length of the optical system 5.

By satisfying the condition (1.1), the occurrence of off-axis aberration can be effectively suppressed.

If $f_A/f_2$ is not larger than the lower limit of the condition (1.1), i.e. 0.02, the power of the second optical element 4 becomes so small that the bundle of extra-axial rays cannot sufficiently be narrowed down. Therefore, the occurrence of aberrations cannot effectively be suppressed. If $f_A/f_2$ is not smaller than the upper limit, i.e. 0.2, the power of the second optical element 4 becomes excessively large. Consequently, the refracting power of the second optical element 4 becomes excessively strong, and spherical and other aberrations occur to such an extent that the aberrations cannot be corrected by another surface. Accordingly, it may become impossible to observe a clear image.

Assuming that $r_{22}$ is the radius of curvature of the first optical element-side refracting surface of the at least two refracting surfaces of the second optical element in the first image display apparatus according to the present invention, it is desirable to satisfy the following condition:

$$-2 < f_A/r_{22} < 0.5 \quad (2)$$

Examples 1 to 7 (described later) correspond to the above-described arrangement of the image display apparatus.

Assuming that $r_{22}$ is the radius of curvature of the first optical element-side surface 22 of the at least two refracting surfaces of the second optical element 4, the condition (2) is necessary to satisfy in order to give a favorable power to the second surface 22 of the second optical element 4. If the condition (2) is satisfied, the height of extra-axial rays entering the first optical element 3 can be reduced even in the case of a wide field angle. Therefore, a compact and lightweight optical system can be realized. At the same time, because the bundle of light rays is narrowed down, the occurrence of comatic aberrations at the second surface 12 can be suppressed very effectively.

If $f_A/r_{22}$ is not larger than the lower limit of the condition (2), i.e. −2, the positive power of the second surface 22 of the second optical element 4 becomes excessively large, and the negative power of the first surface 11 of the first optical element 3 tends to become strong. Accordingly, the focal length of the entire optical system cannot sufficiently be reduced, and it becomes difficult to realize a wide field angle. If $f_A/r_{22}$ is not smaller than the upper limit, i.e. 0.5, the negative power of the second surface 22 of the second optical element 4 becomes excessively large. Therefore, the second optical element 4 and the first optical element 3 may interfere with each other.

It is more desirable to satisfy the following condition:

$$-1 < f_A/r_{22} < 0.3 \tag{2.1}$$

The condition (2.1) is necessary to satisfy in order to give an optimal power to the second surface 22 of the second optical element 4. If $f_A/r_{22}$ is not larger than the lower limit of the condition (2.1), i.e. −1, the positive power of the second surface 22 of the second optical element 4 becomes excessively large, and the negative power of the first surface 11 of the first optical element 3 tends to become strong. Accordingly, the bundle of light rays diverges at the first surface 11, and it becomes difficult to suppress the occurrence of comatic aberrations at the second surface 12. If $f_A/r_{22}$ is not smaller than the upper limit, i.e. 0.3, the negative power of the second surface 22 of the second optical element 4 becomes excessively large. Consequently, the second optical element 4 cannot have a sufficiently large positive power, and it becomes impossible to ensure a necessary focal length for the optical system.

In a case where the first image display apparatus according to the present invention satisfies the condition (2), it is desirable to satisfy the following condition:

$$-3 < r_{11}/r_{22} < 10 \tag{3}$$

where $r_{11}$, is the radius of curvature of the first surface of the first optical element, and $r_{22}$ is the radius of curvature of the first optical element-side refracting surface of the at least two refracting surfaces of the second optical element.

Examples 1 to 7 (described later) correspond to the above-described arrangement of the image display apparatus.

Assuming that $r_{22}$ is the radius of curvature of the first optical element-side surface 22 of the second optical element 4, and $r_{11}$ is the radius of curvature of the first surface 11 of the first optical element 3, it is important to satisfy the condition (3) from the viewpoint of enabling the above-described advantageous effects to be exhibited without interference between the optical elements.

If $r_{11}/r_{22}$ is not larger than the lower limit of the condition (3), i.e. −3, the first optical element 3 and the second optical element 4 are likely to interfere with each other, and extra-axial rays are cut off. Consequently, it becomes impossible to observe a peripheral image. If $r_{11}/r_{22}$ is not smaller than the upper limit, i.e. 10, the first optical element 3 and the second optical element 4 have a strong refracting action. Therefore, strong aberrations occur. Moreover, extra-axial rays may fail to enter the first optical element 3.

It is more desirable to satisfy the following condition:

$$-2 < r_{11}/r_{22} < 8 \tag{3.1}$$

The condition (3.1) is necessary to satisfy in order to maintain the optical elements in a favorable positional relationship to each other. If $r_{11}/r_{22}$ is not larger than the lower limit of the condition (3.1), i.e. −2, the first optical element 3 and the second optical element 4 are likely to interfere with each other in the case of a wide field angle in particular, and it becomes impossible to observe a peripheral image. If $r_{11}/r_{22}$ is not smaller than the upper limit, i.e. 8, a negative power cannot sufficiently be given to the first surface 11 of the first optical element 3. In the case of a wide field angle, it is difficult to satisfy the condition for total reflection taking place as internal reflection at the first surface 11.

Next, the second image display apparatus according to the present invention includes an image display device for displaying an image and an optical system for projecting the image displayed by the image display device and for leading the projected image to an observer's eyeball. The optical system includes a first optical element and a second optical element. The first optical element has at least three surfaces, and a space formed by the at least three surfaces is filled with a medium having a refractive index larger than 1. The at least three surfaces are defined as a first surface, a second surface, and a third surface, respectively, in the order in which light rays pass in backward ray tracing from the observer's eyeball to the image display device. The first surface serves as both a refracting surface and an internally reflecting surface. The second surface faces the first surface and is decentered or tilted with respect to the observer's visual axis. The third surface is a refracting surface closest to the image display device. The second optical element is provided between the observer's eyeball and the first optical element and has at least two refracting surfaces. The second surface of the first optical element is a semitransparent reflecting surface that reflects a part of incident light and transmits a part of it. The first and second optical elements are disposed in series in the direction of the observer's visual axis such that the second optical element lies on the eyeball side of the first optical element, and the first optical system lies on the side of the second optical element that is remote from the eyeball. Thus, a bundle of light rays entering the optical system from an external scene passes successively through the first optical element and the second optical element to reach the observer's eyeball.

Examples 6 and 7 (described later) correspond to the above-described arrangement of the image display apparatus.

The second image display apparatus according to the present invention will be described below with regard to only portions in which the second image display apparatus differs from the first image display apparatus. The second surface 12 of the first optical element 3 is formed from a semitransparent surface that reflects a part of incident light and transmits a part of it, thereby enabling a bundle of light rays from an external scene to pass successively through the first optical element 3 and the second optical element 4 and to reach the observer's eyeball 7. Thus, with regard to the image of the image display device 6, the observation field angle can be increased, or the optical system can be constructed in a compact form, and it is possible to provide the observer with a clear observation image as in the case of the first image display apparatus. Moreover, the second image display apparatus enables an image of an external scene to be observed. Alternatively, an external-scene image and an electronic image (i.e. the image of the image display device 6) can be observed superimposed on one another.

FIGS. 2(a), 2(b) and 2(c) are sectional views of the second image display apparatus according to the present invention. FIG. 2(a) shows an observation mode in which the image of the image display device 6 is observed. FIG. 2(b) shows an observation mode in which an image of an external scene is observed. FIG. 2(c) shows an observation mode in which the image of the image display device 6 and the external-scene image are simultaneously observed. The second image display apparatus will be described below with reference to FIGS. 2(a), 2(b) and 2(c), in which the same members or portions as those in FIG. 1 are denoted by the same reference numerals. The second surface 12 of the first optical element 3 is a semitransparent surface. Therefore, in FIG. 2(b), a bundle of light rays from a right-hand external scene enters the first optical element 3 through the second surface 12 and passes through the first surface 11 of the first optical element 3 to enter the second optical element 4 through the second surface 22. Then, the light rays pass through the first surface 21 of the second optical element 4 and enter the observer's pupil 1. Thus, the observer can recognize an image of the external scene.

To observe only an image of an external scene, the image display device 6 is turned off, and a light-blocking device 8 such as a liquid-crystal shutter, which is disposed on the side of the optical system 5 that is remote from the eyeball 7, is placed in the light-transmitting mode [see FIGS. 2(b) and 2(c)]. To observe both an electronic image and an external-scene image superimposed on one another, as shown in FIG. 2(c), the image display device 6 is turned on to display an image, and the light-blocking device 8 is placed in the light-transmitting mode. To observe only the electronic image, as shown in FIG. 2(a), the light-blocking device 8 is placed in the light-blocking mode. Thus, the image of the image display device 6 can be observed as in the case of FIG. 1.

In the above-described second image display apparatus, it is preferable that the composite power of the first and second optical elements should be approximately zero for light from an external scene.

Examples 6 and 7 (described later) correspond to the above-described arrangement of the image display apparatus.

With this arrangement, a ray bundle from an external scene is incident on the observer's pupil 1 as a bundle of approximately parallel rays. Therefore, a clear external-scene image can be observed.

In the second image display apparatus and also in a case where the above-described composite power is made approximately zero, it is desirable to satisfy the following condition:

$$-2 < r_{12}/r_{21} < 4 \qquad (4)$$

where $r_{12}$ is the radius of curvature of the second surface of the first optical element, and $r_{21}$ is the radius of curvature of the observer-side surface of the second optical element.

Examples 6 and 7 (described later) correspond to the above-described arrangement of the image display apparatus.

The condition (4) is necessary to satisfy in order to obtain a clear external-scene image for observation. If $r_{12}/r_{21}$ is not larger than the lower limit of the condition (4), i.e. −2, the first and second optical elements 3 and 4 undesirably have a composite power. In particular, the power of the second surface 12 of the first optical element 3, which is an entrance surface for light from an external scene, becomes undesirably large. Consequently, it becomes impossible to observe a clear external-scene image. If $r_{12}/r_{21}$ is not smaller than the upper limit, i.e. 4, the power of the first surface 21 of the second optical element 4 becomes excessively small, and it becomes impossible to obtain the aberration correcting effect of the second optical element 4 with respect to a bundle of light rays from the image display device 6. Consequently, the observation of the electronic image may be hindered.

In the second image display apparatus and also in the case of an image display apparatus having the above-described limitation, it is desirable to satisfy the following condition:

$$0.01 < f_A/f_2 < 0.3 \qquad (5)$$

where $f_2$ is the focal length of the second optical element, and $f_A$ is the focal length of the optical system.

Examples 6 and 7 (described later) correspond to the above-described arrangement of the image display apparatus.

Assuming that $f_2$ is the focal length in the YZ-plane of the second optical element 4 defined with respect to the axial principal ray emanating from the center of the observer's pupil 1 and reaching the center of the display surface of the image display device 6, and $f_A$ is the focal length of the optical system 5, if the condition (5) is satisfied, the image display apparatus can have the above-described advantageous effect of the second optical element 4 while ensuring a focal length that enables observation at a wide field angle. In the case of a wide field angle in particular, the second optical element 4 has an appropriate positive power. Therefore, it is possible to realize a compact and lightweight optical system. At the same time, the occurrence of comatic aberration can be suppressed very effectively. Moreover, the refracting power of the optical system 5 for external light can be effectively made approximately zero by satisfying the condition (5).

If $f_A/f_2$ is not larger than the lower limit of the condition (5), i.e. 0.01, the power of the second optical element 4 becomes excessively small, and the above-described effect of reducing the height of extra-axial rays becomes insufficient. Consequently, the size of the optical system 5 becomes undesirably large, and the occurrence of aberrations cannot be suppressed. If $f_A/f_2$ is not smaller than the upper limit, i.e. 0.3, the power of the second optical element 4 becomes excessively large. Accordingly, the power of the optical system 5 with respect to external light becomes positive, and it becomes difficult to observe a clear external-scene image.

In the second image display apparatus and also in the case of an image display apparatus having the above-described limitation, it is desirable to satisfy the following condition:

$$-2 < f_A/r_{22} < 0.5 \qquad (6)$$

where $f_A$ is the focal length of the optical system, and $r_{22}$ is the radius of curvature of the first optical element-side refracting surface of the at least two refracting surfaces of the second optical element.

Examples 6 and 7 (described later) correspond to the above-described arrangement of the image display apparatus.

The condition (6) is necessary to satisfy in order to give an optimal power to the second surface 22 of the second optical element 4 with respect to light from an external scene. If $f_A/r_{22}$ is not larger than the lower limit of the condition (6), i.e. −2, the positive power of the second surface 22 of the second optical element 4 becomes excessively large, and the negative power of the first surface 11 of the first optical element 3 tends to become strong. Accordingly, the positive power in the first optical element 3 becomes insufficient, and it becomes difficult to realize a wide field angle. If $f_A/r_{22}$ is not smaller than the upper limit, i.e. 0.5, the negative power of the second surface 22 of the second optical element 4 becomes excessively large. Consequently, the second optical element 4 cannot have a sufficiently large positive power, and it becomes impossible to ensure a necessary focal length for the optical system of wide field angle.

In the second image display apparatus and also in the case of an image display apparatus having the above-described limitation, it is desirable to satisfy the following condition:

$$-3<r_{11}/r_{22}<10 \qquad (7)$$

where $r_{11}$ is the radius of curvature of the first surface of the first optical element, and $r_{22}$ is the radius of curvature of the first optical element-side refracting surface of the at least two refracting surfaces of the second optical element.

Examples 6 and 7 (described later) correspond to the above-described arrangement of the image display apparatus.

The condition (7) is necessary to satisfy in order to enable a clear external-scene image and electronic image to be observed without interference between the two optical elements. If $r_{11}/r_{22}$ is not larger than the lower limit of the condition (7), i.e. −3, the first and second optical elements 3 and 4 are likely to interfere with each other, and extra-axial rays are cut off. Consequently, it becomes impossible to observe a peripheral portion of each of the external-scene and electronic images. If $r_{11}/r_{22}$ is not smaller than the upper limit, i.e. 10, the first optical element 3 and the second optical element 4 have a strong refracting action. Therefore, strong aberrations occur, and it becomes difficult to observe a clear external-scene image. Moreover, with regard to the electronic image, extra-axial rays, part the image display d (rays closer to the image display device 6), may fail to enter the first optical element 3.

Further, in the second image display apparatus and also in the case of an image display apparatus having the above-described limitation, it is desirable to dispose a light-blocking device on the side of the first optical element that is remote from the observer's pupil.

The image display apparatuses shown in FIGS. 2(a), 2(b) and 2(c) and FIGS. 15(a) and 15(b) correspond to the above-described arrangement of the image display apparatus.

In the image display apparatus according to the present invention, it is important to dispose a light-blocking device on the side of the optical system that is remote from the observer in order to change over an external-scene image and an electronic image from one to another. When it is not desired to observe an external-scene image, light from the external scene must be prevented from entering the optical system by using a light-blocking device. If no light-blocking device were used, the external light would always enter the observer's eyeball, making it impossible to observe an electronic image of high contrast. Conversely, when it is desired to observe only an external-scene image, the image display device is stopped from displaying an image, and the light-blocking device is placed in the light-transmitting mode.

In any of the foregoing image display apparatuses, it is desirable that the first and second optical elements should be apart from each other at at least a part of each of them.

Examples 1 to 7 (described later) correspond to the above-described arrangement of the image display apparatus.

In a case where the internal reflection at the first surface 11 of the first optical element 3 is total reflection, if the second optical element 4 is cemented to the first surface 11 of the first optical element 3, the first surface 11 is undesirably brought into contact with a substance other than the air, and the critical angle at the interface changes. Consequently, the angle of reflection at the first surface 11 fails to satisfy the condition for total reflection, which requires the reflection angle to be equal to or larger than the critical angle. Accordingly, light rays from the image display device 6 cannot reach the pupil 1, and it becomes impossible to observe the electronic image.

In any of the foregoing image display apparatuses, it is desirable to satisfy the following condition:

$$0.1<d_2/d_1<0.7 \qquad (8)$$

where $d_1$ is the distance traversed by an axial principal ray emanating from the center of the display surface of the image display device and reaching the observer's pupil to pass through the first optical element, and $d_2$ is the distance traversed by the axial principal ray to pass through the second optical element.

Examples 1 to 7 (described later) correspond to the above-described arrangement of the image display apparatus.

It is important to satisfy the condition (8) in order to enable the second optical element 4 to act effectively.

FIG. 18 shows the way in which the axial principal ray emanates from the image display device 6 and reaches the observer's pupil 1 in the optical system 5 of the image display apparatus according to the present invention, and also shows distances $d_1$, $d_2$, k and ER and incident angles $\theta_1$ to $\theta_4$, $\theta_i$, $\theta_a$ and $\theta_b$ set at each surface. The sign of the angle at each reflection point shown in FIG. 18 is positive when the direction from the normal at the reflection point toward the axial principal ray is counterclockwise.

If $d_2/d_1$ is not larger than the lower limit of the condition (8), i.e. 0.1, the second optical element 4 cannot obtain a sufficient thickness. Consequently, the effect of reducing the height of rays at the second surface 12 by refraction, which is the primary action of the second optical element 4, reduces. Alternatively, the air separation between the first and second optical elements 3 and 4 becomes large. Therefore, extra-axial rays may fail to enter the first optical element 3. If $d_2/d_1$ is not smaller than the upper limit, i.e. 0.7, the first optical element 3 cannot obtain a sufficient thickness. In the case of a wide field angle, extra-axial rays, particularly upper rays are eclipsed and hence become impossible to observe.

In any of the foregoing image display apparatuses, it is desirable to satisfy the following condition:

$$0.2<(d_1+d_2+k)/ER<1.2 \qquad (9)$$

where $d_1$ is the distance from the first surface to the second surface of the first optical element that is traversed by an axial principal ray emanating from the center of the display surface of the image display device and reaching the observer's pupil; k is the distance between the first and second optical elements at respective points where the axial principal ray intersects the two optical elements; $d_2$ is the distance traversed by the axial principal ray to pass through the second optical element; and ER is the distance from the observer's pupil to the second optical element traversed by the axial principal ray.

Examples 1 to 7 (described later) correspond to the above-described arrangement of the image display apparatus.

The condition (9) is necessary to satisfy in order to construct the apparatus in a compact form so that the apparatus will not impose a heavy load on the observer. If $(d_1+d_2+k)/ER$ is not larger than the lower limit of the condition (9), i.e. 0.2, the amount to which the apparatus projects from the observer's face becomes undesirably large. Consequently, the weight balance of the structure becomes unfavorable for an apparatus adapted to be mounted on the human head. If $(d_1+d_2+k)/ER$ is not smaller than the upper limit, i.e. 1.2, the distance from the observer's face to the apparatus becomes excessively short. Therefore, the apparatus is likely to interfere with the observer's face.

In any of the foregoing image display apparatuses, it is desirable to satisfy the following condition:

$$-50°<\theta_2<0° \quad (10)$$

where $\theta_2$ is an incident angle at which an axial principal ray emanating from the center of the display surface of the image display device and reaching the observer's pupil is incident on the second surface of the first optical element in the backward ray tracing.

Examples 1 to 7 (described later) correspond to the above-described arrangement of the image display apparatus.

The above expression (10) is a condition for disposing the optical system 5 and the image display device 6 of the image display apparatus according to the present invention at appropriate positions, respectively. If $\theta_2$ is not smaller than the upper limit of the condition (10), i.e. 0°, rays reflected by the second surface 12 undesirably return to the observer. Accordingly, it becomes impossible to perform observation. Conversely, if $\theta_2$ is not larger than the lower limit, i.e. −50°, the distance to the reflection position on the first surface 11 undesirably increases. Consequently, the second surface 12 becomes long, and hence the size of the optical system 5 becomes extremely large.

In any of the foregoing image display apparatuses, it is desirable to satisfy the following condition:

$$-30°<\theta_2<-5° \quad (11)$$

where $\theta_2$ is an incident angle at which an axial principal ray emanating from the center of the display surface of the image display device and reaching the observer's pupil is incident on the second surface of the first optical element in the backward ray tracing.

Examples 1 to 7 (described later) correspond to the above-described arrangement of the image display apparatus.

The above expression (11) is a condition for disposing the optical system 5 and the image display device 6 of the image display apparatus according to the present invention at appropriate positions, respectively, for a wider field angle. If $\theta_2$ is not smaller than the upper limit of the condition (10), i.e. −50°, in a case where the optical system 5 is arranged such that total reflection takes place at the second surface 12, rays reflected by the second surface 12 are incident on the first surface 11 at an angle that does not satisfy the condition for the critical angle, and hence the reflected rays undesirably pass through the optical system 5 and return to the observer. Accordingly, it becomes impossible to perform observation. Conversely, if $\theta_2$ is not larger than the lower limit, i.e. −30°, the reflection angle becomes undesirably large. Consequently, comatic aberrations due to decentration occur to such an extent that the aberrations cannot satisfactorily be corrected by another surface, and it becomes difficult to observe a sharp image.

In any of the foregoing image display apparatuses, it is desirable to satisfy the following condition:

$$0°<\theta_1<50° \quad (12)$$

where $\theta_1$ is an incident angle at which an axial principal ray emanating from the center of the display surface of the image display device and reaching the observer's pupil is first incident on the first surface of the first optical element in the backward ray tracing.

Examples 1 to 7 (described later) correspond to the above-described arrangement of the image display apparatus.

The above expression (12) is a condition for disposing the optical system 5 of the image display apparatus according to the present invention at an appropriate position or at an appropriate angle. If $\theta_1$ is not larger than the lower limit of the condition (12), i.e. 0°, the optical system 5 bows toward the observer. Therefore, the first and second optical elements 3 and 4 are likely to interfere with each other. Conversely, if $\theta_1$ is not smaller than the upper limit, i.e. 50°, the optical system 5 undesirably projects forward, resulting in an apparatus of bad weight balance.

In any of the foregoing image display apparatuses, it is desirable to satisfy the following condition:

$$0°<\theta_1<40° \quad (13)$$

where $\theta_1$ is an incident angle at which an axial principal ray emanating from the center of the display surface of the image display device and reaching the observer's pupil is first incident on the first surface of the first optical element in the backward ray tracing.

Examples 1 to 7 (described later) correspond to the above-described arrangement of the image display apparatus.

The above expression (13) is a condition for disposing the optical system 5 of the image display apparatus according to the present invention at an appropriate position or at an appropriate angle. If $\theta_1$ is not larger than the lower limit of the condition (13), i.e. 0°, the optical system 5 bows toward the observer. Therefore, the first and second optical elements 3 and 4 are likely to interfere with each other. Conversely, if $\theta_1$ is not smaller than the upper limit, i.e. 40°, the amount of chromatic aberration produced by the first surface 11 of the first optical element 3 increases. In particular, off-axis lateral chromatic aberration markedly appears, making it difficult to observe a sharp image.

In any of the foregoing image display apparatuses, it is desirable to satisfy the following condition:

$$20°<\theta_3<70° \quad (14)$$

where $\theta_3$ is an incident angle at which an axial principal ray emanating from the center of the display surface of the image display device and reaching the observer's pupil is incident on the first surface of the first optical element for the second time in the backward ray tracing.

Examples 1 to 7 (described later) correspond to the above-described arrangement of the image display apparatus.

The above expression (14) is a condition for arranging the optical system of the image display apparatus according to the present invention in a structure which is compact and lightweight and yet enables observation. If $\theta_3$ is not larger than the lower limit of the condition (14), i.e. 20°, the light rays internally reflected by the first surface 11 return to the second surface 12 and are then reflected by the second surface 12 to return to the observer's face, making it impossible to perform observation. Conversely, if $\theta_3$ is not smaller than the upper limit, i.e. 70°, a position at which light rays reach the second surface 12 after being reflected by the first surface 11 of the first optical element 3 in the forward ray tracing is undesirably far away from the reflection point. Consequently, the optical system 5 undesirably increases in size.

In any of the foregoing image display apparatuses, it is desirable to satisfy the following condition:

$$30° < \theta_3 < 60° \quad (15)$$

where $\theta_3$ is an incident angle at which an axial principal ray emanating from the center of the display surface of the image display device and reaching the observer's pupil is incident on the first surface of the first optical element for the second time in the backward ray tracing.

Examples 1 to 7 (described later) correspond to the above-described arrangement of the image display apparatus.

The above expression (15) is a condition for arranging the optical system of the image display apparatus according to the present invention in a structure which is compact and lightweight and yet enables observation. If $\theta_3$ is not larger than the lower limit of the condition (15), i.e. 30°, it becomes difficult to satisfy the condition for the critical angle at the first surface 11, and it becomes impossible to perform observation. Conversely, if $\theta_3$ is not smaller than the upper limit, i.e. 60°, a position at which light rays reach the second surface 12 after being reflected by the first surface 11 in the forward ray tracing is undesirably far away from the reflection point. Consequently, the optical system 5 undesirably increases in size.

In any of the foregoing image display apparatuses, it is desirable to satisfy the following condition:

$$-10° < \theta_4 < 30° \quad (16)$$

where $\theta_4$ is an incident angle at which an axial principal ray emanating from the center of the display surface of the image display device and reaching the observer's pupil is incident on the third surface of the first optical element in the backward ray tracing.

Examples 1 to 7 (described later) correspond to the above-described arrangement of the image display apparatus.

The above expression (16) is a condition for enabling the observer to view the image of the image display device clearly over the length and breadth of it through the optical system of the image display apparatus according to the present invention. If $\theta_4$ is not larger than the lower limit of the condition (16), i.e. -10°, light rays undesirably return to the first surface 11. Therefore, the reflected light rays undesirably reach the observer's face, making it impossible to perform observation. Conversely, if $\theta_4$ is not smaller than the upper limit, i.e. 80°, the distance from the internal reflection point on the first surface 11 becomes exceedingly long, causing the optical system 5 to lengthen downward. As a result, the optical system 5 becomes undesirably large in size.

In any of the foregoing image display apparatuses, it is desirable to satisfy the following condition:

$$-40° < \theta_l < 40° \quad (17)$$

where $\theta_l$ is an incident angle at which an axial principal ray emanating from the center of the display surface of the image display device and reaching the observer's pupil is incident on the display surface of the image display device in the backward ray tracing.

Examples 1 to 7 (described later) correspond to the above-described arrangement of the image display apparatus.

The above expression (17) is a condition for enabling the observer to view the image of the image display device clearly over the length and breadth of it through the optical system of the image display apparatus according to the present invention. If $\theta_l$ is not larger than the lower limit of the condition (17), i.e. -40°, or not smaller than the upper limit of the condition (17), i.e. 40°, light emitted from the image display device 6 cannot sufficiently be supplied to the observer's pupil. Hence, it becomes difficult to observe a bright and clear image.

In any of the foregoing image display apparatuses, it is desirable to satisfy the following condition:

$$-20° < \theta_i < 20° \quad (18)$$

where $\theta_i$ is an incident angle at which an axial principal ray emanating from the center of the display surface of the image display device and reaching the observer's pupil is incident on the display surface of the image display device in the backward ray tracing.

Examples 1 to 7 (described later) correspond to the above-described arrangement of the image display apparatus.

The above expression (18) is a condition for enabling the observer to view the image of the image display device clearly over the length and breadth of it through the optical system of the image display apparatus according to the present invention. If $\theta_i$ is not larger than the lower limit of the condition (18), i.e. -20°, or not smaller than the upper limit of the condition (18), i.e. 20°, the image for observation has an undesirably low contrast in a case where the image display device 6 has a small viewing angle as viewing angle characteristics. In the case of an LCD (Liquid Crystal Display) in particular, reversal of image is likely to occur because of the small viewing angle, making it difficult to observe the image clearly.

In any of the foregoing image display apparatuses, it is desirable to satisfy the following condition:

$$-20° < \theta_a < 30° \quad (19)$$

where $\theta_a$ is an incident angle at which an axial principal ray emanating from the center of the display surface of the image display device and reaching the observer's pupil is incident on the observer-side surface of the second optical element in the backward ray tracing.

Examples 1 to 7 (described later) correspond to the above-described arrangement of the image display apparatus.

If $\theta_a$ is not larger than the lower limit of the condition (19), i.e. -20°, the second optical element 4 bows toward the observer. Therefore, the second optical element, 4 is likely to interfere with the observer's head. If $\theta_a$ is not smaller than the upper limit, i.e. 30°, the second optical element 4 bows toward the first optical element 3. Therefore, the effect of refraction with respect to the upper rays cannot be obtained.

In any of the foregoing image display apparatuses, it is desirable to satisfy the following condition:

$$-20° < \theta_b < 50° \quad (20)$$

where $\theta_b$ is an incident angle at which an axial principal ray emanating from the center of the display surface of the image display device and reaching the observer's pupil is incident on the first optical element-side surface of the second optical element in the backward ray tracing.

Examples 1 to 7 (described later) correspond to the above-described arrangement of the image display apparatus.

If $\theta_b$ is not larger than the lower limit of the condition (20), i.e. −20°, the second surface 22 of the second optical element 4 bows toward the first optical element 3. Therefore, the second surface 22 is likely to interfere with the first optical element 3. Conversely, if $\theta_b$ is not smaller than the upper limit, i.e. 50°, the first optical element 3 and the second optical element 4 have a strong refracting action. Therefore, strong aberrations occur, and it may become impossible to view a clear observation image.

In any of the foregoing image display apparatuses, it is desirable to satisfy the following condition:

$$1.45 < N_d < 2.0 \quad (21)$$

where $N_d$ is the refractive index for the spectral d-line of the medium having a refractive index larger than 1.

Examples 1 to 7 (described later) correspond to the above-described arrangement of the image display apparatus.

It is desirable that the optical system 5 of the image display apparatus according to the present invention should be formed by using a transparent medium of high transparency which is known as "optical glass" or "optical plastic". In this case, the refractive index for the spectral d-line of the medium must satisfy the condition (21). If the refractive index $N_d$ is not larger than the lower limit of the condition (21) or not smaller than the upper limit of the condition (21), transparency becomes undesirably low, and machinability or processability degrades.

In any of the foregoing image display apparatuses, it is desirable to satisfy the following condition:

$$1.5 < N_d < 2.0 \quad (22)$$

where $N_d$ is the refractive index for the spectral d-line of the medium having a refractive index larger than 1.

Examples 1 to 7 (described later) correspond to the above-described arrangement of the image display apparatus.

It is favorable for the first optical element 3 in the optical system of the image display apparatus according to the present invention to have as large a refractive index as possible in order to satisfy the condition for internal reflection at the first surface 11. Therefore, it is desirable to use a medium that satisfies the condition (22). If the refractive index $N_d$ is not larger than the lower limit of the condition (22), i.e. 1.5, extra-axial light rays cannot satisfy the condition for total reflection at the first surface 11, particularly in the case of a wide field angle. Therefore, there are cases where it is difficult to observe the edge of the image.

In any of the foregoing image display apparatuses, it is desirable that the internal reflection at the first surface should be total reflection.

Examples 1 to 7 (described later) correspond to the above-described arrangement of the image display apparatus.

If the light rays reflected by the second surface 12 of the first optical element 3 are totally reflected by the first surface 11 in the backward ray tracing, it is possible to obtain great advantages in terms of the size of the optical elements and from the viewpoint of performance. This will be explained below with reference to FIG. 1.

Light rays coming out of the pupil 1 pass through the second optical element 4 and enter the first optical element 3 while being refracted by the first surface 11. The incident light rays are reflected by the second surface 12, which is a concave mirror, and internally reflected by the first surface 11. If there is a large difference between the height at which upper extra-axial light rays U are reflected by the second surface 12 and the height at which the upper extra-axial light rays U are reflected by the first surface 11 after being reflected by the second surface 12, the overall length of the optical system 5 correspondingly increases, resulting in an increase of the overall size of the optical system 5. That is, as the difference between the heights of the reflection points decreases, the size of the optical system 5 can be made smaller. In other words, if the size of the optical system is kept constant, as the difference between the heights of the reflection points becomes smaller, the field angle for observation can be widened.

However, if the difference between the reflection heights of the upper extra-axial light rays U at the second surface 12 and the first surface 11 is reduced in the optical system of the present invention, the upper light rays U are reflected at a position higher than a position at which lower extra-axial light rays L are incident on the first surface 11. Accordingly, when the first surface 11 is not a totally reflecting surface, the refracting region of the first surface 11 overlaps the reflecting region. Consequently, the lower light rays L are undesirably blocked.

If the internal reflection at the first surface 11 satisfies the condition for total reflection, the first surface 11 need not be mirror-coated. Therefore, even if the upper light rays U after reflection at the second surface 12 and the lower light rays L incident on the first surface 11 interfere with each other at the first surface 11, the upper and lower light rays U and L can perform their original functions. At the second surface 12, which is a decentered reflecting surface, as the reflection angle becomes larger, comatic aberration occurs to a larger extent. However, in a case where light rays are totally reflected by the first surface 11, the angle of reflection at the second surface 12 can be reduced. Therefore, it is possible to effectively suppress the occurrence of comatic aberration at the second surface 12.

In any of the foregoing image display apparatuses, it is desirable that the second surface should be arranged as a reflecting surface which is concave toward the first surface.

Examples 1 to 7 (described later) correspond to the above-described arrangement of the image display apparatus.

In a case where the second surface 12 is a reflecting surface which is concave toward the first surface 11, the second surface 12 is a principal reflecting surface having a positive power in the optical system. Principal rays diverging from the pupil 1 at a certain angle (field angle) are reflected by the second surface 12 having a positive power, thereby enabling the angle to be reduced. Accordingly, it is possible to reduce the size of all the surfaces, from the first surface 11 to the third surface 13 after the reflection at the second surface 12, and hence possible to arrange the whole optical system in a compact and lightweight structure.

In any of the foregoing image display apparatuses, it is desirable that the first surface should be a surface which functions as both a transmitting surface and a reflecting surface and which is convex toward the second surface.

Examples 1 to 7 (described later) correspond to the above-described arrangement of the image display apparatus.

It is possible to effectively correct coma and field curvature produced by the second surface 12 by arranging the first optical element 3 such that the first surface 11 of the first optical element 3 functions as both a transmitting surface and a reflecting surface and is convex toward the second surface 12, and the first surface 11 has a negative power, and that light rays are internally reflected by the first surface 11 after being reflected by the second surface 12.

In a case where the second surface 12 is a reflecting surface having a positive power, the negative comatic aberration produced by the second surface 12 can be corrected by allowing the first surface 11 to have a negative power so that the first surface 11 produces comatic aberration opposite in sign to the comatic aberration produced by the second surface 12.

Further, the positive field curvature produced by the second surface 12 can be simultaneously corrected by producing negative field curvature at the first surface 11.

In order to allow the first surface 11 to perform total reflection as internal reflection, it is necessary to satisfy the condition that reflection angles of all light rays at the first surface 11 are not smaller than the critical angle $\theta_r = \sin^{-1}(1/n)$ (where n is the refractive index of a medium constituting the optical system). In the case of n=1.5, for example, $\theta_r = 41.81°$, and a reflection angle not smaller than it is necessary. If the first surface 11 is convex toward the second surface 12, lines normal to the first surface 11 at the reflection points divergently extend toward the second surface 12. Accordingly, the reflection angle can be effectively increased even for the extra-axial rays. Thus, the condition for total reflection at the second surface 12 can be readily satisfied at a wide field angle.

In any of the foregoing image display apparatuses, it is desirable that at least one surface of the first optical element should be a plane surface which functions as both a transmitting surface and a reflecting surface.

Examples 3 and 4 (described later) correspond to the above-described arrangement of the image display apparatus.

If at least one surface of the optical system is a plane surface, the other surfaces can be defined with the plane surface used as a reference; this facilitates the mechanical design and production of the optical system. Thus, it also becomes possible to shorten the machining or processing time and readily arrange the layout of the whole apparatus. Accordingly, it is possible to realize a considerable cost reduction.

In any of the foregoing image display apparatuses, at least a part of the internally reflecting region of the first surface may be provided with a reflection coating.

When the internal reflection at the first surface 11 of the first optical element 3 does not satisfy the condition for total reflection, the internally reflecting region of the first surface 11 needs to be provided with a reflection coating of aluminum, for example.

In any of the foregoing image display apparatuses, it is desirable that at least one of the surfaces constituting the optical system should be an aspherical surface.

Examples 1 to 7 (described later) correspond to the above-described arrangement of the image display apparatus.

It is effective for aberration correction that at least one of the surfaces constituting the optical system is an aspherical surface. This is an important condition for correcting comatic aberrations, particularly higher-order comatic aberrations and coma flare, produced by the second surface 12, which is decentered in the Y-axis direction Y or tilted with respect to the visual axis.

In an image display apparatus which uses an optical system of the type having a decentered or tilted reflecting surface in front of an observer's eyeball as in the present invention, light rays are obliquely incident on the reflecting surface even on the axis. Therefore, complicated comatic aberration is produced at the center axis of the reflecting mirror. The complicated comatic aberration increases as the tilt angle of the reflecting surface becomes larger. However, if it is intended to realize a compact and wide-field image display apparatus, it is difficult to ensure an observation image having a wide field angle unless the amount of eccentricity (displacement) or the tilt angle is increased to a certain extent because of the interference between the image display device and the optical path. Accordingly, as the field angle of an image display apparatus becomes wider and the size thereof becomes smaller, the tilt angle of the reflecting surface becomes larger. As a result, how to correct comatic aberration due to decentration becomes a serious problem.

To correct such complicated comatic aberration, any one of the first, second and third surfaces 11, 12 and 13 of the first optical element 3 constituting the optical system is formed into a decentered aspherical surface. By doing so, the power of the optical system can be made asymmetric with respect to the visual axis. Further, the effect of the aspherical surface can be utilized for off-axis aberration. Accordingly, it becomes possible to effectively correct comatic aberrations, including axial aberration.

In this case, it is desirable that at least one of the surfaces constituting the optical system should be an anamorphic surface.

Examples 1 to 3 and 5 to 7 (described later) correspond to the above-described arrangement of the image display apparatus.

It is important that at least one of the surfaces constituting the optical system should be an anamorphic surface. That is, at least one of the surfaces should be a surface in which the radius of curvature in the YZ-plane and the radius of curvature in the XZ-plane, which perpendicularly intersects the YZ-plane, are different from each other. This is a condition for correcting aberration which occurs because the second surface 12 is decentered or tilted with respect to the visual axis. In general, if a spherical surface is decentered, the curvature relative to light rays incident on the surface in the plane of incidence and that in a plane perpendicularly intersecting the incidence plane differ from each other. Therefore, in an optical system where a reflecting surface is disposed in front of an observer's eyeball in such a manner as to be decentered or tilted with respect to the visual axis as in the present invention, an image on the visual axis lying in the center of the observation image is also astigmatically aberrated for the reason stated above. In order to correct the axial astigmatism, it is important that any one of the first, second and third surfaces 11, 12 and 13 of the first optical element 3 in the optical system 5 should be formed so that the radius of curvature in the plane of incidence and that in a plane perpendicularly intersecting the incidence plane are different from each other.

In this case, it is desirable that at least one of the surfaces constituting the optical system should be a three-dimensional surface.

Example 4 (described later) corresponds to the above-described arrangement of the image display apparatus.

If at least one of the surfaces constituting the optical system is a three-dimensional surface, it is possible to satisfy the condition for obtaining the above-described effect produced by an aspherical surface or an anamorphic surfacer and hence possible to effectively correct aberrations produced in the optical system. Here, the three-dimensional surface is a curved surface expressed, for example, by $$z = \sum_{n=0}^{k} \sum_{m=0}^{k'} c_{nm} x^m y^{n-m} \quad (23)$$

where x, y and z denote orthogonal coordinates, $C_{nm}$ is an arbitrary coefficient, and k and k' are also arbitrary values, respectively.

In any of the foregoing image display apparatuses, it is desirable that the display surface of the image display device should be tilted with respect to an axial principal ray emanating from the center of the display surface of the image display device and reaching the observer's pupil.

Examples 1 to 7 (described later) correspond to the above-described arrangement of the image display apparatus.

It is important that the display surface of the image display device 6 should be tilted with respect to the visual axis. In a case where a refracting or reflecting surface which constitutes the optical element 3 or 4 is decentered or tilted, the refraction or reflection angle of light rays from the pupil 1 at the refracting or reflecting surface varies according to the image height, and the image plane may be tilted with respect to the visual axis. In such a case, the tilt of the image plane can be corrected by tilting the display surface of the image display device 6 with respect to the visual axis.

It is desirable for any of the foregoing image display apparatuses to have a device for positioning both the image display device and the optical system with respect to the observer's head.

The image display apparatus shown in FIGS. 15(*a*) and 15(*b*) corresponds to the above-described arrangement of the image display apparatus.

It becomes possible for the observer to see a stable observation image by providing a device for positioning both the image display device 6 and the optical system 5 with respect to the observer's head.

It is desirable for any of the foregoing image display apparatuses to have a device for supporting both the image display device and the optical system with respect to the observer's head such that the apparatus can be mounted on the observer's head.

The image display apparatus shown in FIGS. 15(*a*) and 15(*b*) corresponds to the above-described arrangement of the image display apparatus.

By allowing both the image display device 6 and the optical system 5 to be mounted on the observer's head with a supporting device, it becomes possible for the observer to see the observation image in a desired posture and from a desired direction.

It is desirable for any of the foregoing image display apparatuses to have a device for supporting at least a pair of image display apparatuses at a predetermined spacing.

The image display apparatus shown in FIGS. 15(*a*) and 15(*b*) corresponds to the above-described arrangement of the image display apparatus.

It becomes possible for the observer to perform observation with both eyes without fatigue by providing a device for supporting at least two image display apparatuses at a predetermined spacing. Further, if images with a disparity therebetween are displayed on the right and left image display devices, and these images are observed with both eyes, it is possible to enjoy viewing a stereoscopic image.

The optical system in any of the foregoing image display apparatuses can be used as an image-forming optical system.

The arrangements shown in FIGS. 16 and 17 (described later) correspond to the above-described use application of the optical system according to the present invention.

If the optical system is arranged to form an image of an object at infinity with the image display surface in the optical system defined as an image plane, the optical system can be used as an image-forming optical system, e.g. a finder optical system for a camera such as that shown in FIG. 16.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 19 shows the optical system of a conventional image display apparatus.

FIGS. 20(*a*) and 20(*b*) show the optical system of another conventional image display apparatus.

DESCRIPTION OF THE PREFERRED EMBODIMENTS

Examples 1 to 7 of the image display apparatus according to the present invention will be described below with reference to the accompanying drawings.

Figure 3:
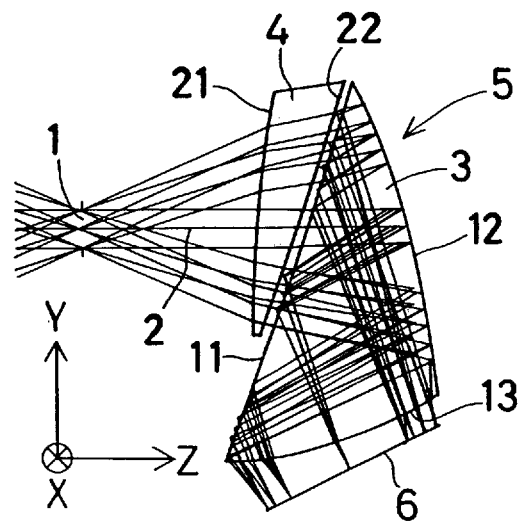
FIG. 3 illustrates an optical ray trace of Example 1 of an optical system in an image display apparatus according to the present invention.
Figure 4:
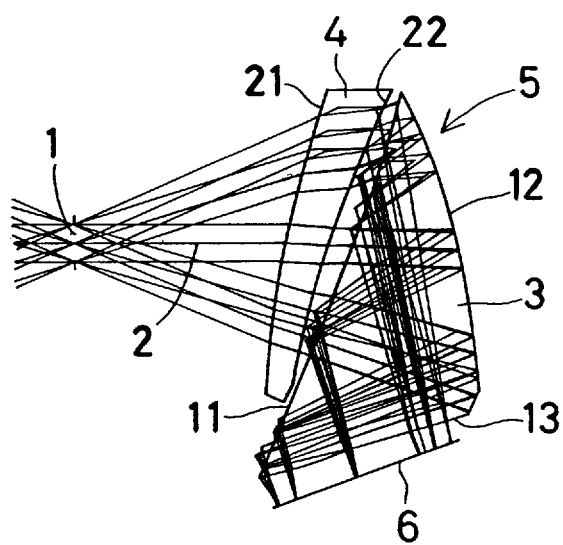
FIG. 4 illustrates an optical ray trace of Example 2 of an optical system in an image display apparatus according to the present invention.
Figure 5:
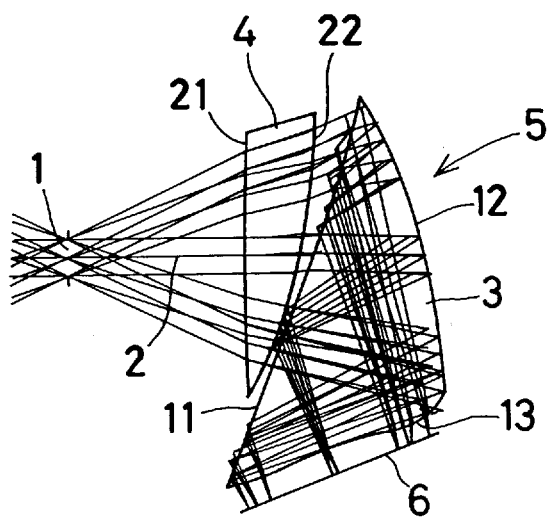
FIG. 5 illustrates an optical ray trace of Example 3 of an optical system in an image display apparatus according to the present invention.
Figure 6:
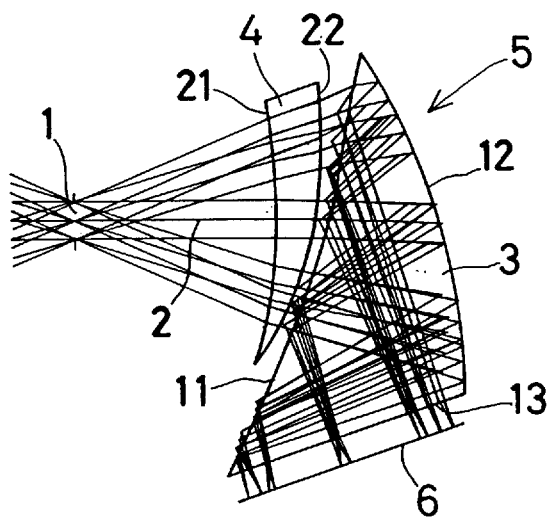
FIG. 6 illustrates an optical ray trace of Example 4 of an optic system in an image display apparatus according to the present invention.
Figure 7:
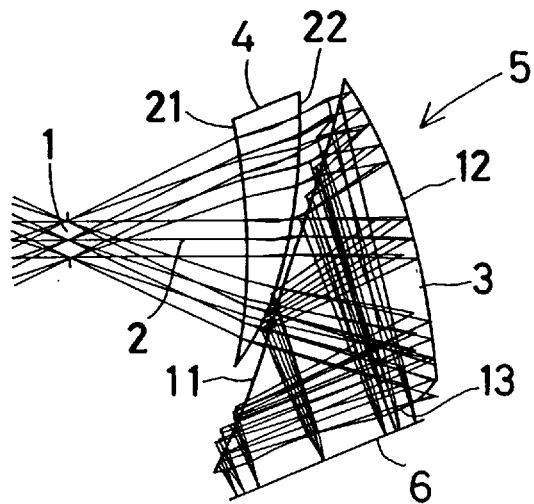
FIG. 7 illustrates an optical ray trace of Example 5 of an optical system in an image display apparatus according to the present invention.
Figure 8:
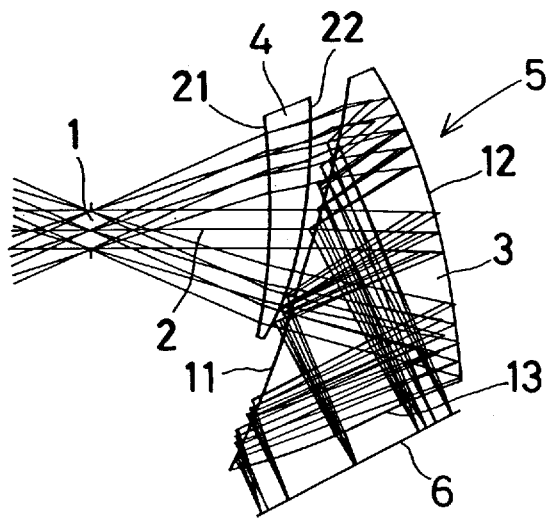
FIG. 8 illustrates an optical ray trace of Example 6 of an optical system in an image display apparatus according to the present invention.
Figure 9:
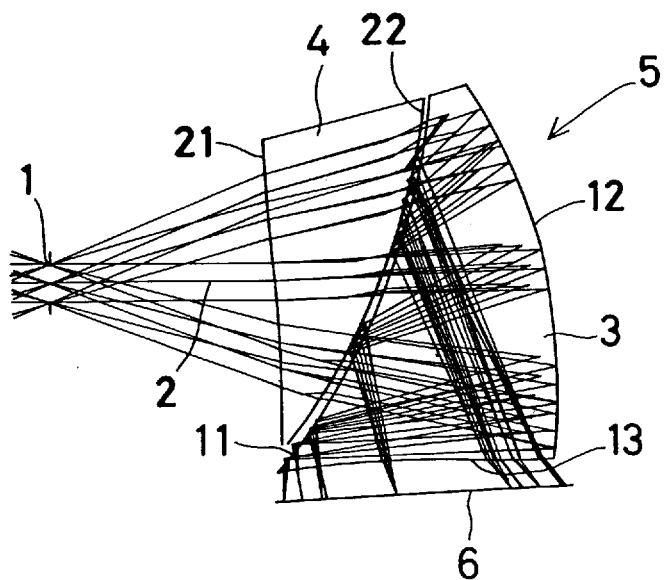
Fig. 9 illustrates an optical ray trace of Example 7 of an optical system in an image display apparatus according to the present invention.

Constituent parameters of each example will be shown later. In the following description, the surface Nos. are shown as ordinal numbers in backward tracing from an observer's pupil position 1 toward an image display device 6. A coordinate system is defined as follows: As shown for example in FIG. 3, which is concerned with Example 1, with the observer's iris position 1 defined as the origin, the direction of an observer's visual axis 2 is taken as a Z-axis, where the direction toward the optical system 5 from the origin is defined as a positive direction, and the vertical direction (as viewed from the observer's eyeball) which perpendicularly intersects the observer's visual axis 2 is taken as a Y-axis, where the upward direction is defined as a positive direction. Further, the horizontal direction (as viewed from the observer's eyeball) which perpendicularly intersects the observer's visual axis 2 is taken as an X-axis, where the leftward direction is defined as a positive direction. That is, the plane of FIG. 3 is defined as a YZ-plane, and a plane which is perpendicular to the plane of the figure is defined as an XZ-plane. Further, it is assumed that the optical axis is bent in the YZ-plane, which is parallel to the plane of the figure.

In the constituent parameters (shown later), regarding each surface for which displacements (eccentricities) Y and Z and tilt angle θ are shown, the eccentricity Y is a distance by which the vertex of the surface is displaced in the Y-axis direction from the surface No. 1 (pupil position 1), which is a reference surface. The eccentricity Z is a distance by which the vertex of the surface is displaced in the Z-axis direction from the surface No. 1. The tilt angle θ is the angle of inclination of the center axis of the surface from the Z-axis. In this case, positive θ means counterclockwise rotation. However, regarding the second surface 22 of the second optical element 4 in Example 5, eccentricities Y and Z and a tilt angle θ are similarly given with respect to a coordinate system defined as follows: The vertex of the first surface 21 is defined as a new origin, and the center axis thereof is defined as a new Z-axis. Similarly, a new Y-axis is defined according to the new Z-axis. Regarding each surface for which a surface separation is shown (i.e. the first surface 21 of the second optical element 4 in Examples 1 to 4 and 6), the surface and the subsequent surface are coaxial with respect to each other, and the axial distance between the two surfaces is shown as a surface separation.

The non-rotationally symmetric aspherical configuration of each surface may be expressed in the coordinate system defining the surface as follows:

$$Z = [(X^2/R_x) + (Y^2/R_y)]/[1 + \{1 - (1 + K_x)(X^2/R_x^2) -$$
$$(1 + K_y)(Y^2/R_y^2)\}^{1/2}] + AR[(1 - AP)X^2 + (1 + AP)Y^2]^2 +$$
$$BR[(1 - BP)X^2 + (1 + BP)Y^2]^3 + CR[(1 - CP)X^2 + (1 + CP)Y^2]^4 +$$
$$DR[(1 - DP)X^2 + (1 + DP)Y^2]^5$$

where $R_y$ is the paraxial curvature radius of the surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR, BR, CR and DR are 4th-, 6th-, 8th- and 10th-order aspherical coefficients, respectively, which are rotationally symmetric with respect to the Z-axis; and AP, BP, CP and DP are 4th-, 6th-, 8th- and 10th-order aspherical coefficients, respectively, which are rotationally asymmetric with respect to the Z-axis.

Each three-dimensional surface is a polynomial surface expressed by the following equation:

$$Z = C_2 + C_3Y + C_4X + C_5Y^2 + C_6YX + C_7X^2 +$$
$$C_8Y^3 + C_9Y^2X + C_{10}YX^2 + C_{11}X^3 + C_{12}Y^4 + C_{13}Y^3X + C_{14}Y^2X^2 +$$
$$C_{15}YX^3 + C_{16}X^4 + C_{17}Y^5 + C_{18}Y^4X + C_{19}Y^3X^2 + C_{20}Y^2X^3 +$$
$$C_{21}YX^4 + C_{22}X^5 + C_{23}Y^6 + C_{24}Y^5X + C_{25}Y^4X^2 + C_{26}Y^3X^3 +$$
$$C_{27}Y^2X^4 + C_{28}YX^5 + C_{29}X^6 + C_{30}Y^7 + C_{31}Y^6X + C_{32}Y^5X^2 +$$
$$C_{33}Y^4X^3 + C_{34}Y^3X^4 + C_{35}Y^2X^5 + C_{36}YX^6 + C_{37}X^7 \ldots$$

where $C_m$ (m is an integer of 2 or higher) are coefficients.

In the constituent parameters (shown later), coefficients concerning aspherical surfaces which are not shown are zero. The refractive index of a medium between surfaces is expressed by the refractive index for the spectral d-line. Lengths are given in millimeters.

Figure 1:
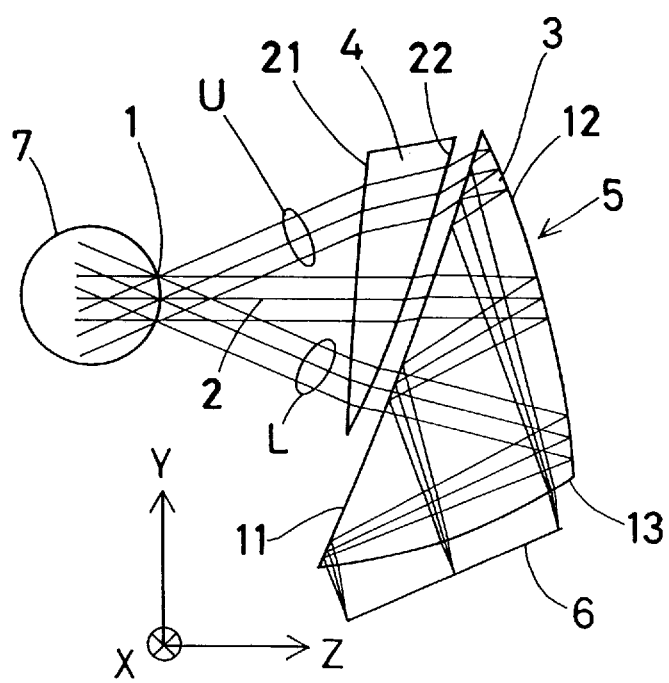
FIG. 1 is a sectional view of a first image display apparatus according to the present invention.
Figure 2A:
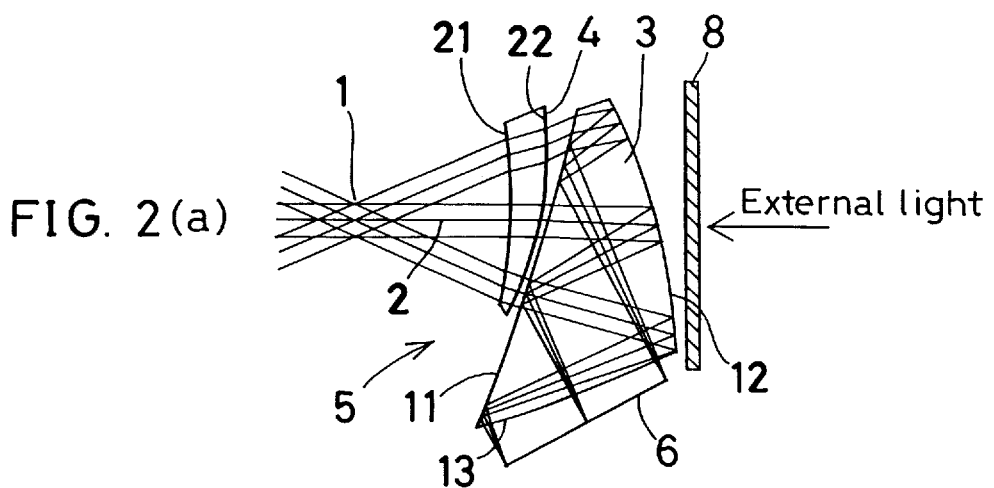
FIGS. 2(*a*), 2(*b*) and 2(*c*) are sectional views showing a second image display apparatus according to the present invention in various observation modes.
Figure 2B:
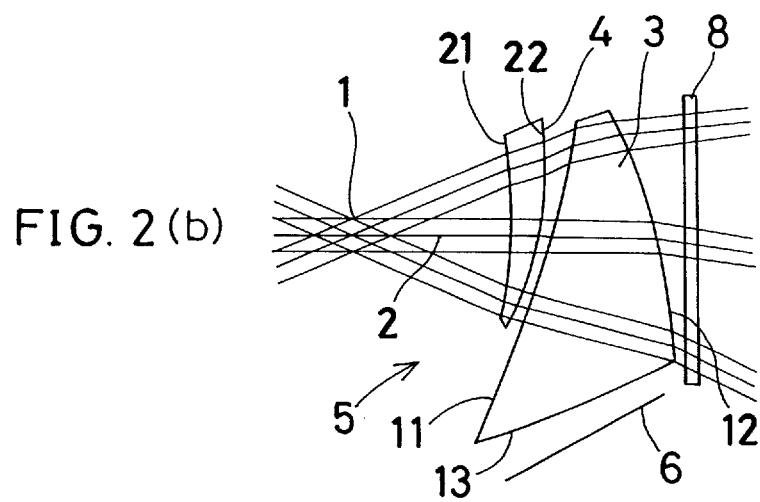
Figure 2C:
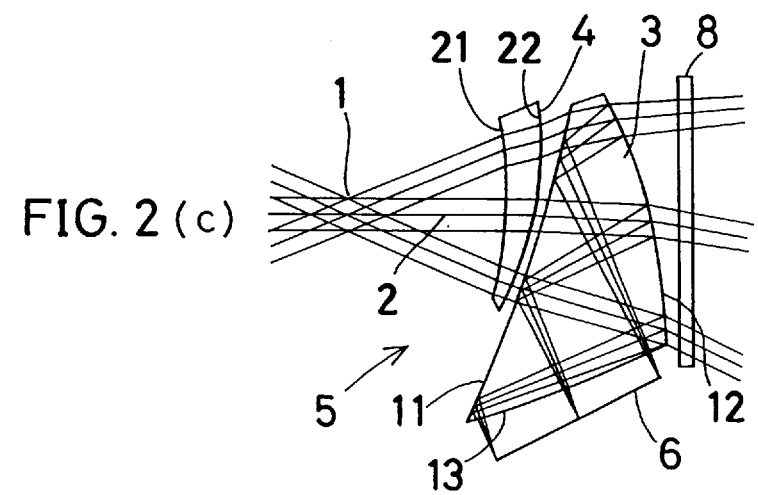
Figure 10:
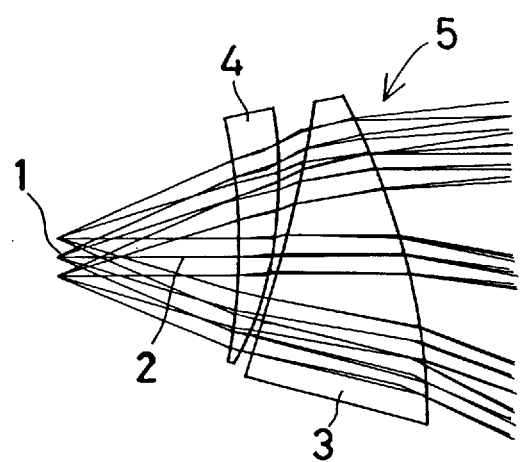
FIG. 10 shows a ray path of external light in the optical system according to Example 6.
Figure 11:
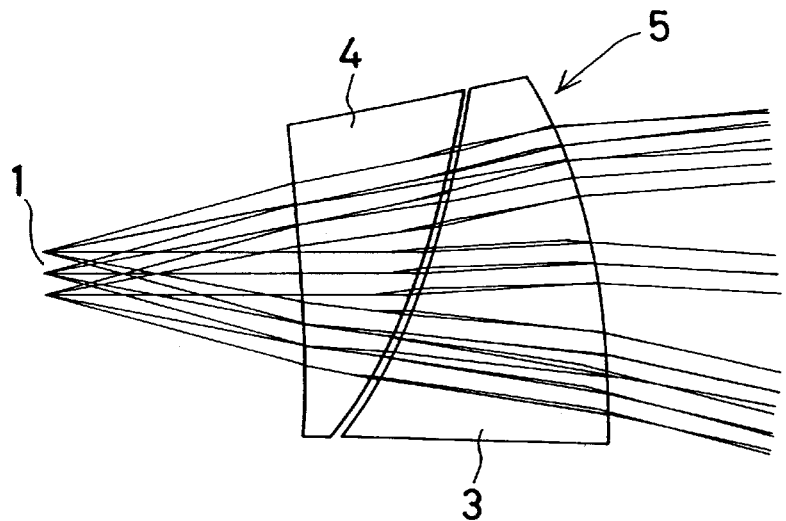
FIG. 11 shows a ray path of external light in the optical system according to Example 7.

FIGS. 3 to 9 are sectional views showing image display apparatuses designed for a single eye according to Examples 1 to 7, respectively. In each sectional view, reference numeral 1 denotes an observer's pupil position; 2 denotes an observer's visual axis; 3 denotes a first optical element; 4 denotes a second optical element; 5 denotes an optical system; 6 denotes an image display device; 11 denotes a first surface of the first optical element; 12 denotes a second surface of the first optical element; 13 denotes a third surface of the first optical element; 21 denotes a first surface of the second optical element; and 22 denotes a second surface of the second optical element. It should be noted that in FIGS. 3 to 9 light rays are depicted as if they were reflected at positions out of the first optical element 3 because the ray tracing is three-dimensionally carried out. In actuality, the light rays are reflected by the first and second surfaces 11 and 12 of the first optical element 3 as shown in FIGS. 1 and 2. FIGS. 10 and 11 show ray paths of external light in Examples 6 and 7, respectively.

The actual path of light rays in these examples is as follows: In Example 1, for example, a bundle of light rays emitted from the image display device 6 enters the optical system 5 while being refracted by the third surface 13 of the first optical element 3. The incident light rays are internally reflected by the first surface 11 and reflected by the second surface 12. The reflected light rays exit from the first optical element 3 while being refracted by the first surface 11. Then, the light rays enter the second optical element 4 while being refracted by the second surface 22 and exit from the second optical element 4 while being refracted by the first surface 21 so as to be projected into the observer's eyeball with the observer's iris position or eyeball rolling center as an exit pupil 1.

In an actual apparatus, needless to say, the direction in which the light rays are reflected by the optical system 5 may be any of the upward, downward and sideward directions of the observer.

The values of field angles and so forth in each example are as follows:

EXAMPLE 1

This example corresponds to the first image display apparatus according to the present invention. In this example, the horizontal field angle is 60°, while the vertical field angle is 46.8°, and the pupil diameter is 4 millimeters. The second optical element 4 is a positive lens. In the numerical data (shown later), surface Nos. 2 and 3 are spherical surfaces, and surface Nos. 4, 5, 6 and 7 are anamorphic surfaces.

Values concerning the above-described conditions are as follows ($N_{d1}$ is the refractive index of the medium constituting the first optical element 3, and $N_{d2}$ is the refractive index of the medium constituting the second optical element 4; the same shall apply hereinafter):

$f_A/f_2=0.042$
$f_A/r_{22}=0.076$
$r_{11}/r_{22}=-0.31$
$d_2/d_1=0.46$
$(d_1+d_2+k)/ER=0.93$
$\theta_1=31.5°$
$\theta_2=-14.7°$
$\theta_3=50.8°$
$\theta_4=-0.6°$
$\theta_i=-5.2°$
$\theta_a=5.4°$
$\theta_b=19.6°$
$N_{d1}=1.5254$
$N_{d2}=1.6201$

EXAMPLE 2

This example corresponds to the first image display apparatus according to the present invention. In this example, the horizontal field angle is 60°, while the vertical field angle is 46.8°, and the pupil diameter is 4 millimeters. The second optical element 4 is a positive lens. In the numerical data (shown later), surface Nos. 2 and 3 are spherical surfaces, and surface Nos. 4, 5, 6 and 7 are anamorphic surfaces.

Values concerning the above-described conditions are as follows:

$f_A/f_2=0.066$
$f_A/r_{22}=0.13$
$r_{11}/r_{22}=-1.50$
$d_2/d_1=0.47$
$(d_1+d_2+k)/ER=0.85$
$\theta_1=24.7°$
$\theta_2=-16.9°$
$\theta_3=52.1°$
$\theta_4=-1.1°$
$\theta_i=5.0°$
$\theta_a=12.8°$
$\theta_b=-14.1°$
$N_{d1}=1.5254$
$N_{d2}=1.6492$

EXAMPLE 3

This example corresponds to the first image display apparatus according to the present invention. In this Tm example, the horizontal field angle is 60°, while the vertical field angle is 51.1°, and the pupil diameter is 4 millimeters. The second optical element 4 is a positive lens. In the numerical data (shown later), surface No. 2 is a plane surface; surface No. 3 is a spherical surface; and surface Nos. 4, 5, 6 and 7 are anamorphic surfaces.

Values concerning the above-described conditions are as follows:

$f_A/f_2=0.18$
$f_A/r_{22}=-0.29$
$r_{11}/r_{22}=5.88$
$d_2/d_1=0.52$
$(d_1+d_2+k)/ER=0.95$
$\theta_1=27.7°$
$\theta_2=-15.4°$
$\theta_3=49.9°$
$\theta_4=1.6°$
$\theta_i=-0.7°$
$\theta_a=0°$
$\theta_b=13.3°$
$N_{d1}=1.5254$
$N_{d2}=1.6200$

EXAMPLE 4

This example corresponds to the first image display apparatus according to the present invention. In this example, the horizontal field angle is 60°, while the vertical field angle is 46.8°, and the pupil diameter is 4 millimeters. The second optical element 4 is a positive lens. In the numerical data (shown later), surface Nos. 2 and 3 are spherical surfaces; surface Nos. 4, 5 and 6 are three-dimensional surfaces; and surface No. 7 is a plane surface.

Values concerning the above-described conditions are as follows:

$f_A/f_2=0.10$
$f_A/r_{22}=-0.56$
$r_{11}/r_{22}=4.66$
$d_2/d_1=0.37$
$(d_1+d_2+k)/ER=0.50$
$\theta_1=19.6°$
$\theta_2=-17.1°$
$\theta_3=52.2°$
$\theta_4=0.3°$
$\theta_i=0.3°$
$\theta_a=0°$
$\theta_b=10.2°$
$N_{d1}=1.4922$
$N_{d2}=1.6200$

EXAMPLE 5

This example corresponds to the first image display apparatus according to the present invention. In this example, the horizontal field angle is 65°, while the vertical field angle is 51.1°, and the pupil diameter is 4 millimeters. The second optical element 4 is a modified prism. In the numerical data (shown later), surface Nos. 2 and 3 are spherical surfaces; and surface Nos. 4, 5, 6 and 7 are anamorphic surfaces.

Values concerning the above-described conditions are as follows:

$f_A/f_2=0.092$
$f_A/r_{22}=-0.42$
$r_{11}/r_{22}=5.84$
$d_2/d_1=0.42$
$(d_1+d_2+k)/ER=0.90$
$\theta_1=26.2°$
$\theta_2=-15.5°$
$\theta_3=50.1°$
$\theta_4=2.5°$
$\theta_i=-1.1°$
$\theta_a=-1.1°$
$\theta_b=13.6°$
$N_{d1}=1.5254$
$N_{d2}=1.5878$

EXAMPLE 6

This example corresponds to the second image display apparatus according to the present invention. In this example, the horizontal field angle is 60°, while the vertical field angle is 46.8°, and the pupil diameter is 4 millimeters. The second optical element 4 is a positive lens. In the numerical data (shown later), surface Nos. 2, 3 and 7 are spherical surfaces; and surface Nos. 4, 5 and 6 are anamorphic surfaces.

Values concerning the above-described conditions are as follows:

$f_A/f_2=0.17$
$f_A/r_{22}=-0.85$
$r_{11}/r_{22}=6.62$
$r_{12}/r_{21}=1.30$
$d_2/d_1=0.29$
$(d_1+d_2+k)/ER=0.91$
$\theta_1=21.7°$
$\theta_2=-15.0°$
$\theta_3=47.0°$
$\theta_4=2.4°$
$\theta_i=-2.0°$
$\theta_a=-2.0°$
$\theta_b=11.1°$
$N_{d1}=1.4922$
$N_{d2}=1.6200$

EXAMPLE 7

This example corresponds to the second image display apparatus according to the present invention. In this example, the horizontal field angle is 55°, while the vertical field angle is 42.7°, and the pupil diameter is 4 millimeters. The second optical element 4 is a modified prism. In the numerical data (shown later), surface Nos. 2 to 7 are anamorphic surfaces.

Values concerning the above-described conditions are as follows:

$f_A/f_2=0.17$
$f_A/r_{22}=-0.44$
$r_{11}/r_{22}=0.74$
$r_{12}/r_{21}=0.18$
$d_2/d_1=0.55$
$(d_1+d_2+k)/ER=0.34$
$\theta_1=34.6°$
$\theta_2=-9.9°$
$\theta_3=49.9°$
$\theta_4=9.8°$
$\theta_i=14.1°$
$\theta_a=-2.9°$
$\theta_b=-23.2°$
$N_{d1}=1.4922$
$N_{d2}=1.4922$ Constituent parameters in the above-described Examples 1 to 7 are as follows:

EXAMPLE 1

| Surface No. | | Radius of curvature | Surface separation | Refractive index (Eccentricity) | | Abbe's No. (Tilt angle) | |
|---|---|---|---|---|---|---|---|
| 1 | | ∞ (pupil) | | | | | |
| 2 | | 144.177 | 7.708 | | 1.6200 | | 60.30 |
| | | | | Y | 24.357 | θ | −14.98° |
| | | | | Z | 23.766 | | |
| 3 | | −269.750 | | | | | |
| 4 | $R_y$ | −550.143 | | | 1.5254 | | 56.25 |
| | $R_x$ | −156.685 | | Y | −13.684 | θ | −20.41° |
| | $K_y$ | 0 | | Z | 20.202 | | |
| | $K_x$ | 0 | | | | | |
| | AR | $4.7204 \times 10^{-7}$ | | | | | |
| | BR | $-2.1851 \times 10^{-10}$ | | | | | |
| | AP | $-7.8185 \times 10^{-1}$ | | | | | |
| | BP | $-7.6833 \times 10^{-1}$ | | | | | |
| 5 | $R_y$ | −82.166 | | | 1.5254 | | 56.25 |
| | $R_x$ | −68.757 | | Y | 13.416 | θ | 24.77° |
| | $K_y$ | −2.9685 | | Z | 30.818 | | |
| | $K_x$ | −2.7751 | | | | | |
| | AR | $-5.6678 \times 10^{-7}$ | | | | | |
| | BR | $2.0188 \times 10^{-11}$ | | | | | |
| | AP | $4.3483 \times 10^{-2}$ | | | | | |
| | BP | 1.0417 | | | | | |
| 6 | $R_y$ | −550.143 | | | 1.5254 | | 56.25 |
| | $R_x$ | −156.685 | | Y | −13.684 | θ | −20.41° |
| | $K_y$ | 0 | | Z | 20.202 | | |
| | $K_x$ | 0 | | | | | |
| | AR | $4.7204 \times 10^{-7}$ | | | | | |
| | BR | $-2.1851 \times 10^{-10}$ | | | | | |
| | AP | $-7.8185 \times 10^{-1}$ | | | | | |
| | BP | $-7.6833 \times 10^{-1}$ | | | | | |
| 7 | $R_y$ | −66.514 | | Y | −21.376 | θ | −65.08° |
| | $R_x$ | −200.496 | | Z | 33.343 | | |
| | $K_y$ | 0 | | | | | |
| | $K_x$ | 0 | | | | | |
| | AR | $-1.5935 \times 10^{-6}$ | | | | | |
| | BR | $-2.4382 \times 10^{-10}$ | | | | | |
| | CR | $1.7829 \times 10^{-12}$ | | | | | |
| | DR | $5.3523 \times 10^{-16}$ | | | | | |
| | AP | 2.9260 | | | | | |
| | BP | $-5.9628 \times 10^{-1}$ | | | | | |
| | CP | $9.1858 \times 10^{-1}$ | | | | | |
| | DP | 1.8310 | | | | | |
| 8 | | ∞(display device) | | Y | −26.271 | θ | −64.32° |
| | | | | Z | 29.316 | | |

EXAMPLE 2

| Surface No. | Radius of curvature | Surface separation | Refractive index (Eccentricity) | | Abbe's No. (Tilt angle) | |
|---|---|---|---|---|---|---|
| 1 | ∞ (pupil) | | | | | |
| 2 | 92.361 | 6.049 | | 1.6492 | | 35.89 |
| | | | Y | 20.000 | θ | −25.98° |

-continued

| Surface No. | | Radius of curvature | Surface separation | | Refractive index (Eccentricity) | | Abbe's No. (Tilt angle) |
|---|---|---|---|---|---|---|---|
| 3 | | 162.754 | | Z | 29.947 | | |
| 4 | $R_y$ | −260.525 | | | 1.5254 | | 56.25 |
| | $R_x$ | −90.997 | | Y | −12.771 | θ | −23.20° |
| | $K_y$ | 0 | | Z | 25.558 | | |
| | $K_x$ | 0 | | | | | |
| | AR | $-3.4450 \times 10^{-8}$ | | | | | |
| | BR | $1.2814 \times 10^{-11}$ | | | | | |
| | AP | −3.3115 | | | | | |
| | BP | 1.2551 | | | | | |
| 5 | $R_y$ | −58.868 | | | 1.5254 | | 56.25 |
| | $R_x$ | −55.487 | | Y | 14.580 | θ | 28.02° |
| | $K_y$ | −4.7015 | | Z | 36.486 | | |
| | $K_x$ | −1.0644 | | | | | |
| | AR | $-1.2231 \times 10^{-6}$ | | | | | |
| | BR | $2.2191 \times 10^{-12}$ | | | | | |
| | AP | $1.2015 \times 10^{-1}$ | | | | | |
| | BP | 2.2767 | | | | | |
| 6 | $R_y$ | −260.525 | | | 1.5254 | | 56.25 |
| | $R_x$ | −90.997 | | Y | −12.771 | θ | −23.20° |
| | $K_y$ | 0 | | Z | 25.558 | | |
| | $K_x$ | 0 | | | | | |
| | AR | $-3.4450 \times 10^{-8}$ | | | | | |
| | BR | $1.2814 \times 10^{-11}$ | | | | | |
| | AP | −3.3115 | | | | | |
| | BP | 1.2551 | | | | | |
| 7 | $R_y$ | 57.208 | | Y | −22.526 | θ | −73.74° |
| | $R_x$ | −251.892 | | Z | 30.468 | | |
| | $K_y$ | 0 | | | | | |
| | $K_x$ | 0 | | | | | |
| | AR | $-5.0169 \times 10^{-8}$ | | | | | |
| | BR | $-3.0938 \times 10^{-9}$ | | | | | |
| | CR | $-2.3050 \times 10^{-11}$ | | | | | |
| | DR | $-2.0691 \times 10^{-13}$ | | | | | |
| | AP | $1.3229 \times 10^{1}$ | | | | | |
| | BP | 3.8084 | | | | | |
| | CP | $1.0861 \times 10^{-1}$ | | | | | |
| | DP | $-1.4081 \times 10^{-1}$ | | | | | |
| 8 | | ∞(display device) | | Y | −25.487 | θ | −70.14° |
| | | | | Z | 31.029 | | |

EXAMPLE 3

| Surface No. | | Radius of curvature | Surface separation | | Refractive index (Eccentricity) | | Abbe's No. (Tilt angle) |
|---|---|---|---|---|---|---|---|
| 1 | | ∞ (pupil) | | | | | |
| 2 | | ∞ | 7.480 | | 1.6200 | | 60.30 |
| | | | | Y | 15.104 | θ | 0° |
| | | | | Z | 20.000 | | |
| 3 | | −65.822 | | | | | |
| 4 | $R_y$ | −344.265 | | | 1.5254 | | 56.25 |
| | $R_x$ | −81.151 | | Y | −20.547 | θ | −22.68° |
| | $K_y$ | 0 | | Z | 19.387 | | |
| | $K_x$ | 0 | | | | | |
| | AR | $9.4424 \times 10^{-7}$ | | | | | |
| | BR | $-5.4739 \times 10^{-10}$ | | | | | |
| | AP | $-7.5618 \times 10^{-1}$ | | | | | |
| | BP | $-8.7221 \times 10^{-1}$ | | | | | |
| 5 | $R_y$ | −72.060 | | | 1.5254 | | 56.25 |
| | $R_x$ | −59.784 | | Y | 20.205 | θ | 30.47° |
| | $K_y$ | −4.7268 | | Z | 30.732 | | |
| | $K_x$ | −1.9065 | | | | | |
| | AR | $-8.0508 \times 10^{-7}$ | | | | | |
| | BR | $2.5088 \times 10^{-13}$ | | | | | |
| | AP | $6.9575 \times 10^{-2}$ | | | | | |
| | BP | 3.8547 | | | | | |
| 6 | $R_y$ | −344.265 | | | 1.5254 | | 56.25 |
| | $R_x$ | −81.151 | | Y | −20.547 | θ | −22.68° |
| | $K_y$ | 0 | | Z | 19.387 | | |
| | $K_x$ | 0 | | | | | |
| | AR | $9.4424 \times 10^{-7}$ | | | | | |
| | BR | $-5.4739 \times 10^{-10}$ | | | | | |
| | AP | $-7.5618 \times 10^{-1}$ | | | | | |
| | BP | $-8.7221 \times 10^{-1}$ | | | | | |
| 7 | $R_y$ | 34.750 | | Y | −20.743 | θ | −71.54° |
| | $R_x$ | 46.014 | | Z | 28.386 | | |
| | $K_y$ | 0 | | | | | |
| | $K_x$ | 0 | | | | | |
| | AR | $-3.5331 \times 10^{-5}$ | | | | | |
| | BR | $-2.5051 \times 10^{-8}$ | | | | | |
| | AP | $-2.4454 \times 10^{1}$ | | | | | |
| | BP | 1.6895 | | | | | |
| 8 | | ∞(display device) | | Y | −23.474 | θ | −68.85° |
| | | | | Z | 29.677 | | |

EXAMPLE 4

| Surface No. | Radius of curvature | Surface separation | | Refractive index (Eccentricity) | | Abbe's No. (Tilt angle) |
|---|---|---|---|---|---|---|
| 1 | ∞(pupil) | | | | | |
| 2 | −56.070 | 6.256 | | 1.6200 | | 60.30 |
| | | | Y | 20.000 | θ | 20.86° |
| | | | Z | 18.566 | | |
| 3 | −41.629 | | | | | |
| 4 | Three-dimensional surface (1) | | | 1.4922 | | 57.50 |
| | | | Y | −3.669 | θ | −19.96° |
| | | | Z | 24.111 | | |
| 5 | Three-dimensional surface (2) | | | 1.4922 | | 57.50 |
| | | | Y | 0.725 | θ | 15.93° |
| | | | Z | 37.118 | | |
| 6 | Three-dimensional surface (1) | | | 1.4922 | | 57.50 |
| | | | Y | −3.669 | θ | −19.96° |
| | | | Z | 24.111 | | |
| 7 | ∞ | | Y | −22.370 | θ | −70.40° |
| | | | Z | 31.935 | | |
| 8 | ∞(display device) | | Y | −26.115 | θ | −70.33° |
| | | | Z | 30.362 | | |

Three-dimensional surface (1)

$C_2$ 2.3629     $C_3$ $-9.0571 \times 10^{-2}$     $C_5$ $-3.8114 \times 10^{-3}$
$C_7$ $-5.4783 \times 10^{-3}$     $C_8$ $8.0951 \times 10^{-5}$     $C_{10}$ $7.9004 \times 10^{-5}$
$C_{12}$ $6.3062 \times 10^{-8}$     $C_{14}$ $-5.0315 \times 10^{-6}$     $C_{16}$ $-1.2985 \times 10^{-6}$
$C_{17}$ $2.8729 \times 10^{-8}$     $C_{19}$ $-1.5040 \times 10^{-7}$     $C_{21}$ $1.4010 \times 10^{-7}$
$C_{23}$ $8.7121 \times 10^{-10}$     $C_{25}$ $1.1502 \times 10^{-8}$     $C_{27}$ $7.0288 \times 10^{-9}$
$C_{29}$ $1.6426 \times 10^{-9}$     $C_{30}$ $-1.2740 \times 10^{-10}$     $C_{32}$ $-9.3810 \times 10^{-11}$
$C_{34}$ $-4.4001 \times 10^{-10}$     $C_{36}$ $-5.1539 \times 10^{-11}$ Three-dimensional surface (2)

$C_2$ 2.5412     $C_3$ $-4.0891 \times 10^{-2}$     $C_5$ $-7.6425 \times 10^{-3}$
$C_7$ $-8.0770 \times 10^{-3}$     $C_8$ $5.6587 \times 10^{-6}$     $C_{10}$ $3.4522 \times 10^{-7}$
$C_{12}$ $7.7512 \times 10^{-8}$     $C_{14}$ $-2.5625 \times 10^{-6}$     $C_{16}$ $-1.1768 \times 10^{-6}$
$C_{17}$ $4.6185 \times 10^{-9}$     $C_{19}$ $-5.1213 \times 10^{-8}$     $C_{21}$ $-1.8532 \times 10^{-8}$
$C_{23}$ $1.2180 \times 10^{-9}$     $C_{25}$ $-1.3456 \times 10^{-9}$     $C_{27}$ $2.4201 \times 10^{-9}$
$C_{29}$ $3.7464 \times 10^{-10}$     $C_{30}$ $3.6312 \times 10^{-10}$     $C_{32}$ $-6.1067 \times 10^{-11}$
$C_{34}$ $-3.9679 \times 10^{-11}$     $C_{36}$ $7.2231 \times 10^{-11}$

EXAMPLE 5

| Surface No. | Radius of curvature | Surface separation | | Refractive index (Eccentricity) | | Abbe's No. (Tilt angle) |
|---|---|---|---|---|---|---|
| 1 | ∞(pupil) | | | | | |
| 2 | −69.068 | | | 1.5878 | | 62.09 |
| | | | Y | 15.068 | θ | 13.74° |
| | | | Z | 18.037 | | |

-continued

| Surface No. | | Radius of curvature | Surface separation | Refractive index (Eccentricity) | | Abbe's No. (Tilt angle) | |
|---|---|---|---|---|---|---|---|
| 3 | | −45.377 | | Y | 3.544 | θ | −0.97° |
|   | | | | Z | 7.937 | | |
| 4 | $R_y$ | −217.255 | | | 1.5254 | | 56.25 |
|   | $R_x$ | −75.009 | | Y | −21.780 | θ | −23.31° |
|   | $K_y$ | 0 | | Z | 17.789 | | |
|   | $K_x$ | 0 | | | | | |
|   | AR | $9.7563 \times 10^{-7}$ | | | | | |
|   | BR | $-4.6063 \times 10^{-10}$ | | | | | |
|   | AP | $-6.3197 \times 10^{-1}$ | | | | | |
|   | BP | $-8.4951 \times 10^{-1}$ | | | | | |
| 5 | $R_y$ | −62.623 | | | 1.5254 | | 56.25 |
|   | $R_x$ | −55.539 | | Y | 17.709 | θ | 31.49° |
|   | $K_y$ | −4.8392 | | Z | 30.470 | | |
|   | $K_x$ | −1.4683 | | | | | |
|   | AR | $-1.2078 \times 10^{-6}$ | | | | | |
|   | BR | $2.8317 \times 10^{-13}$ | | | | | |
|   | AP | $9.4174 \times 10^{-2}$ | | | | | |
|   | BP | 5.5141 | | | | | |
| 6 | $R_y$ | −217.255 | | | a.5254 | | 56.25 |
|   | $R_x$ | 75.009 | | Y | −21.780 | θ | −23.31° |
|   | $K_y$ | 0 | | Z | 17.789 | | |
|   | $K_x$ | 0 | | | | | |
|   | AR | $9.7563 \times 10^{-7}$ | | | | | |
|   | BR | $-4.6063 \times 10^{-10}$ | | | | | |
|   | AP | $-6.3197 \times 10^{-1}$ | | | | | |
|   | BP | $-8.4951 \times 10^{-1}$ | | | | | |
| 7 | $R_y$ | 36.767 | | Y | −21.189 | θ | −71.61° |
|   | $R_x$ | 61.926 | | Z | 27.051 | | |
|   | $K_y$ | 0 | | | | | |
|   | $K_x$ | 0 | | | | | |
|   | AR | $-3.4631 \times 10^{-5}$ | | | | | |
|   | BR | $-1.3247 \times 10^{-8}$ | | | | | |
|   | AP | $-1.8796 \times 10^{-1}$ | | | | | |
|   | BP | 2.2689 | | | | | |
| 8 | | ∞(display device) | | Y | −23.847 | θ | −67.38° |
|   | | | | Z | 28.544 | | |

EXAMPLE 6

| Surface No. | | Radius of curvature | Surface separation | Refractive index (Eccentricity) | | Abbe's No. (Tilt angle) | |
|---|---|---|---|---|---|---|---|
| 1 | | ∞(pupil) | | | | | |
| 2 | | −58.035 | 5.378 | | 1.6200 | | 60.30 |
|   | | | | Y | 18.519 | θ | 16.56° |
|   | | | | Z | 17.628 | | |
| 3 | | −40.935 | | | | | |
| 4 | $R_y$ | −184.656 | | | 1.4922 | | 57.50 |
|   | $R_x$ | −93.381 | | Y | −15.000 | θ | −20.00° |
|   | $K_y$ | 0 | | Z | 19.812 | | |
|   | $K_x$ | 0 | | | | | |
|   | AR | $6.0640 \times 10^{-7}$ | | | | | |
|   | BR | $-1.4782 \times 10^{-17}$ | | | | | |
|   | AP | $-2.8269 \times 10^{-1}$ | | | | | |
|   | BP | $1.2429 \times 10^{2}$ | | | | | |
| 5 | $R_y$ | −70.443 | | | 1.4922 | | 57.50 |
|   | $R_x$ | −64.467 | | Y | 13.000 | θ | 25.04° |
|   | $K_y$ | −1.1982 | | Z | 33.476 | | |
|   | $K_x$ | 0.0491 | | | | | |
|   | AR | $1.2474 \times 10^{-7}$ | | | | | |
|   | BR | $-1.1693 \times 10^{-10}$ | | | | | |
|   | AP | $-6.3525 \times 10^{-2}$ | | | | | |
|   | BP | $2.2874 \times 10^{-1}$ | | | | | |
| 6 | $R_y$ | −184.656 | | | 1.4922 | | 57.50 |
|   | $R_x$ | −93.381 | | Y | −15.000 | θ | −20.00° |
|   | $K_y$ | 0 | | Z | 19.812 | | |
|   | $K_x$ | 0 | | | | | |
|   | AR | $6.0640 \times 10^{-7}$ | | | | | |
|   | BR | $-1.4782 \times 10^{-17}$ | | | | | |
|   | AP | $-2.8269 \times 10^{-1}$ | | | | | |
|   | BP | $1.2429 \times 10^{2}$ | | | | | |

-continued

| Surface No. | | Radius of curvature | Surface separation | Refractive index (Eccentricity) | | Abbe's No. (Tilt angle) | |
|---|---|---|---|---|---|---|---|
| 7 | | −163.655 | | Y | −21.433 | θ | −67.21° |
|   | | | | Z | 28.300 | | |
| 8 | | ∞(display device) | | Y | −25.303 | θ | −61.93° |
|   | | | | Z | 29.395 | | |

EXAMPLE 7

| Surface No. | | Radius of curvature | Surface separation | Refractive index (Eccentricity) | | Abbe's No. (Tilt angle) | |
|---|---|---|---|---|---|---|---|
| 1 | | ∞(pupil) | | | | | |
| 2 | $R_x$ | −275.138 | | | 1.4922 | | 57.50 |
|   | $R_x$ | −60.090 | | Y | −14.777 | θ | 0.00° |
|   | $K_y$ | 15.0220 | | Z | 25.384 | | |
|   | $K_x$ | −1.4455 | | | | | |
|   | AR | $9.1788 \times 10^{-9}$ | | | | | |
|   | BR | $1.3902 \times 10^{-13}$ | | | | | |
|   | AP | 5.5799 | | | | | |
|   | BP | $-1.0579 \times 10^{-1}$ | | | | | |
| 3 | $R_y$ | −51.403 | | Y | −26.016 | θ | −53.08° |
|   | $R_x$ | −44.032 | | Z | 17.347 | | |
|   | $K_y$ | −1.6023 | | | | | |
|   | $K_x$ | −0.6752 | | | | | |
|   | AR | $-1.2698 \times 10^{-9}$ | | | | | |
|   | BR | $-2.3984 \times 10^{-10}$ | | | | | |
|   | AP | 6.1296 | | | | | |
|   | BP | $-3.4350 \times 10^{-2}$ | | | | | |
| 4 | $R_y$ | −54.146 | | | 1.4922 | | 57.50 |
|   | $R_x$ | −113.535 | | Y | −0.593 | θ | −21.97° |
|   | $K_y$ | 0 | | Z | 37.326 | | |
|   | $K_x$ | 0 | | | | | |
|   | AR | $4.5650 \times 10^{-6}$ | | | | | |
|   | BR | $-2.4489 \times 10^{-9}$ | | | | | |
|   | AP | $6.1812 \times 10^{-1}$ | | | | | |
|   | BP | $8.0595 \times 10^{-1}$ | | | | | |
| 5 | $R_y$ | −60.241 | | | 1.4922 | | 57.50 |
|   | $R_x$ | −66.945 | | Y | 24.783 | θ | 36.90° |
|   | $K_y$ | 0 | | Z | 43.446 | | |
|   | $K_x$ | 0 | | | | | |
|   | AR | $-1.5638 \times 10^{-9}$ | | | | | |
|   | BR | $1.2450 \times 10^{-11}$ | | | | | |
|   | AP | $1.1807 \times 10^{1}$ | | | | | |
|   | BP | 1.3334 | | | | | |
| 6 | $R_y$ | −54.146 | | | 1.4922 | | 57.50 |
|   | $R_x$ | −113.535 | | Y | −0.593 | θ | −21.97° |
|   | $K_y$ | 0 | | Z | 37.326 | | |
|   | $K_x$ | 0 | | | | | |
|   | AR | $4.5650 \times 10^{-6}$ | | | | | |
|   | BR | $-2.4489 \times 10^{-9}$ | | | | | |
|   | AP | $6.1812 \times 10^{-1}$ | | | | | |
|   | BP | $8.0595 \times 10^{-1}$ | | | | | |
| 7 | $R_y$ | 85.685 | | Y | −20.894 | θ | −80.32° |
|   | $R_x$ | −20.944 | | Z | 25.000 | | |
|   | $K_y$ | 0 | | | | | |
|   | $K_x$ | 0 | | | | | |
|   | AR | $2.7888 \times 10^{-5}$ | | | | | |
|   | BR | $-2.8188 \times 10^{-9}$ | | | | | |
|   | AP | $-8.8341 \times 10^{-1}$ | | | | | |
| 8 | | ∞(display device) | | Y | −23.546 | θ | −87.63° |
|   | | | | Z | 38.058 | | |

Figure 12:
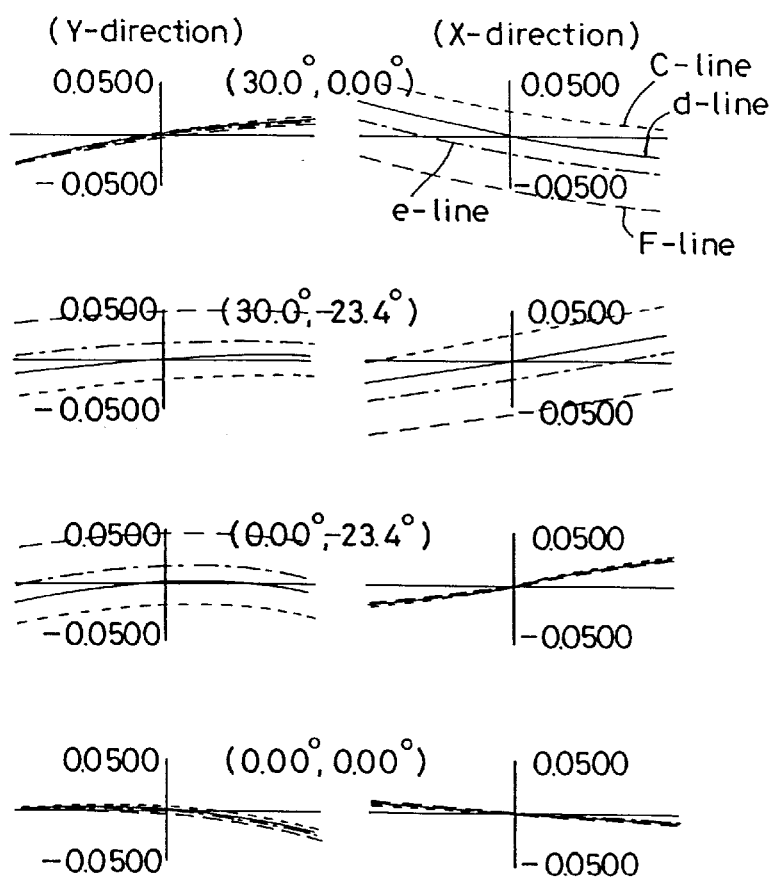
FIG. 12 is a part of an aberrational diagram illustrating lateral aberrations in Example 1 of the present invention.
Figure 13:
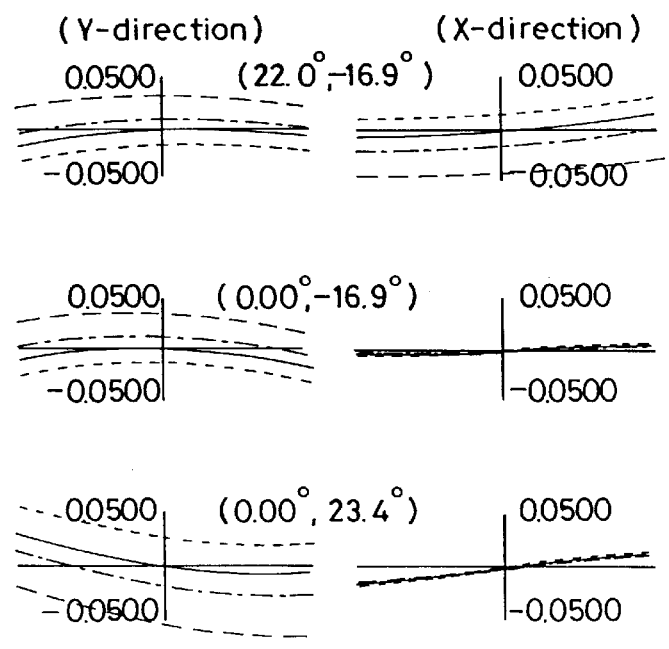
FIG. 13 is another part of the aberrational diagram illustrating lateral aberrations in Example 1 of the present invention.
Figure 14:
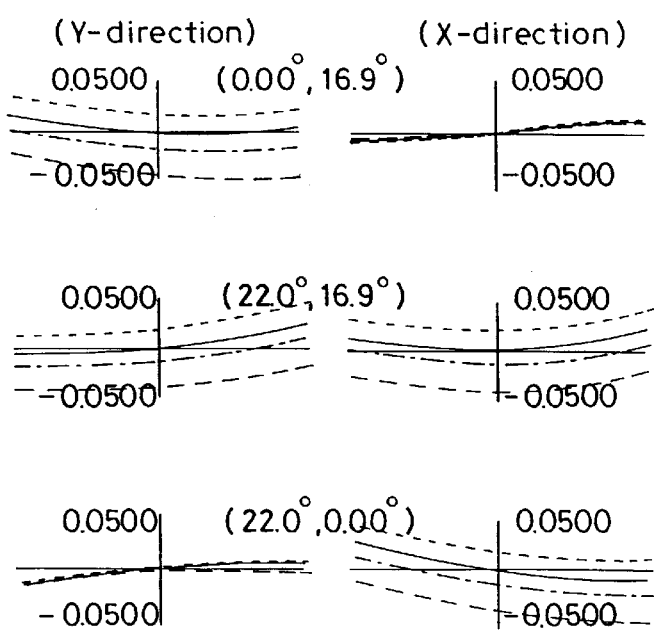
FIG. 14 is the other part of the aberrational diagram illustrating lateral aberrations in Example 1 of the present invention.

Lateral aberrations in the above-described Example 1 are graphically shown in FIGS. 12 to 14. In these aberrational diagrams, the parenthesized numerals denote (horizontal (X-direction) field angle, vertical (Y-direction) field angle), and lateral aberrations at the field angles are shown.

Figure 15:
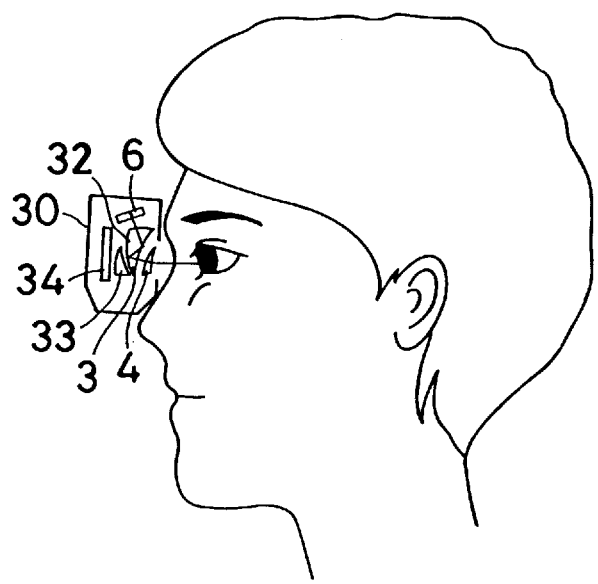
FIGS. 15(*a*) and 15(*b*) are sectional and perspective views showing a head-mounted image display apparatus according to the present invention.
Figure 15:
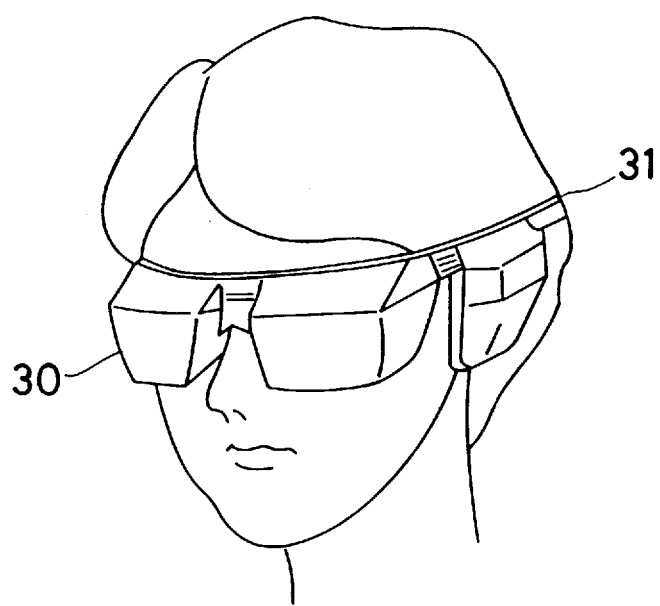

Although the image display apparatus according to the present invention has been described by way of examples, it should be noted that the present invention is not necessarily limited to these examples and that various changes and modifications may be imparted thereto. To arrange the image display apparatus of the present invention as a head-mounted image display apparatus (HMD) 30, as shown in FIGS. 15(*a*) and 15(*b*), the HMD 30 is fitted to the observer's head by using a headband 31, for example, which is attached to the HMD 30. In this example of use, the HMD 30 may be arranged such that the second surface of the first optical element 3 is formed as a semitransparent mirror (half-mirror) 32, and a see-through compensating optical system 33 and a liquid-crystal shutter 34 are provided in front of the half-mirror 32, thereby enabling an image of an external scene to be selectively observed or superimposed on the image of the image display device 6. In this case, the see-through compensating optical system 33 has been set so that the power of the optical system is approximately zero with respect to light from the external scene. In the case of the second image display apparatus according to the present invention, the external scene can be observed without a need of the see-through compensating optical system 33.

Figure 16:
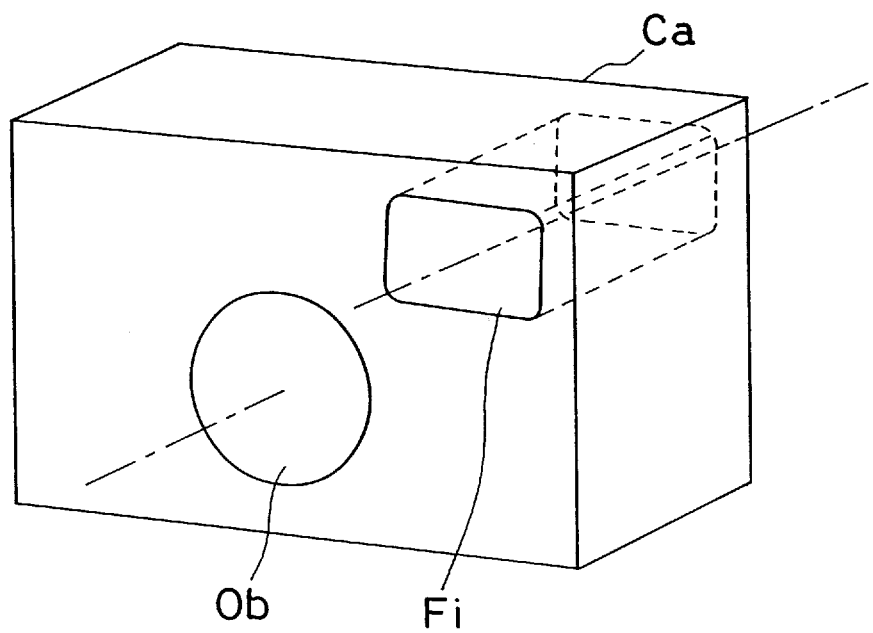
FIG. 16 shows an arrangement of an optical system according to the present invention as it is used as an image-forming optical system.
Figure 17:
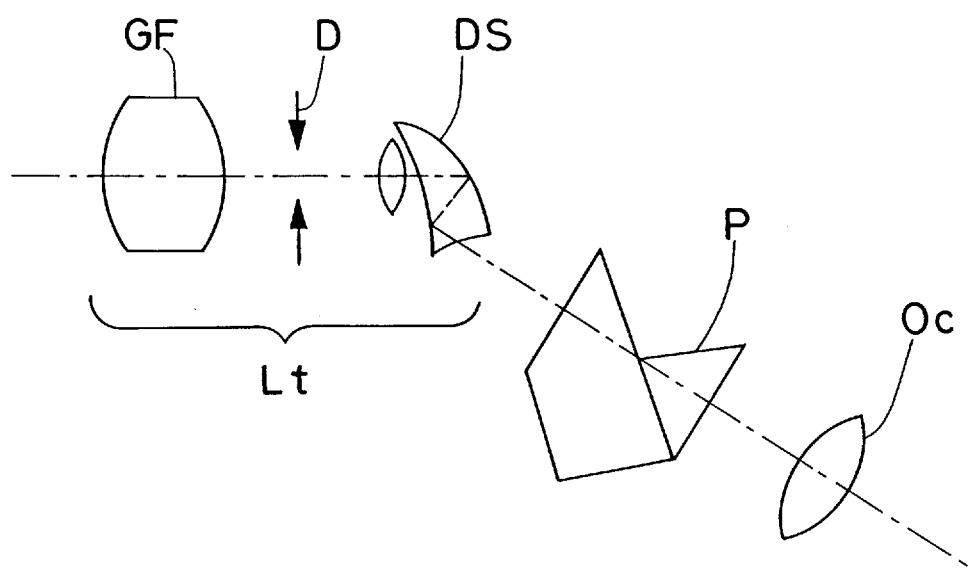
FIG. 17 shows an arrangement of an optical system according to the present invention as it is used as an image-forming optical system.
Figure 18:
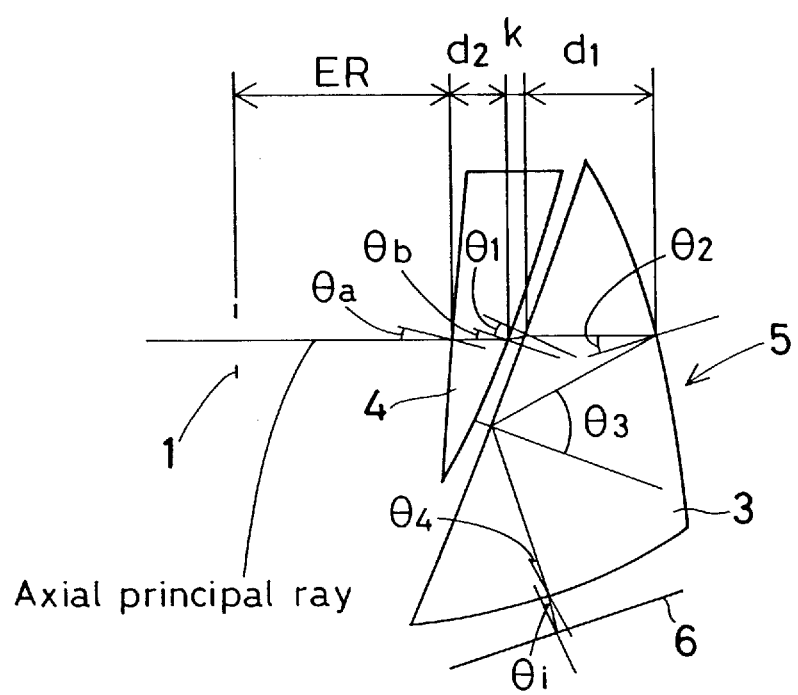
FIG. 18 shows the way in which an axial principal ray travels in an optical system of an image display apparatus according to the present invention, together with various parameters.
Figure 21:
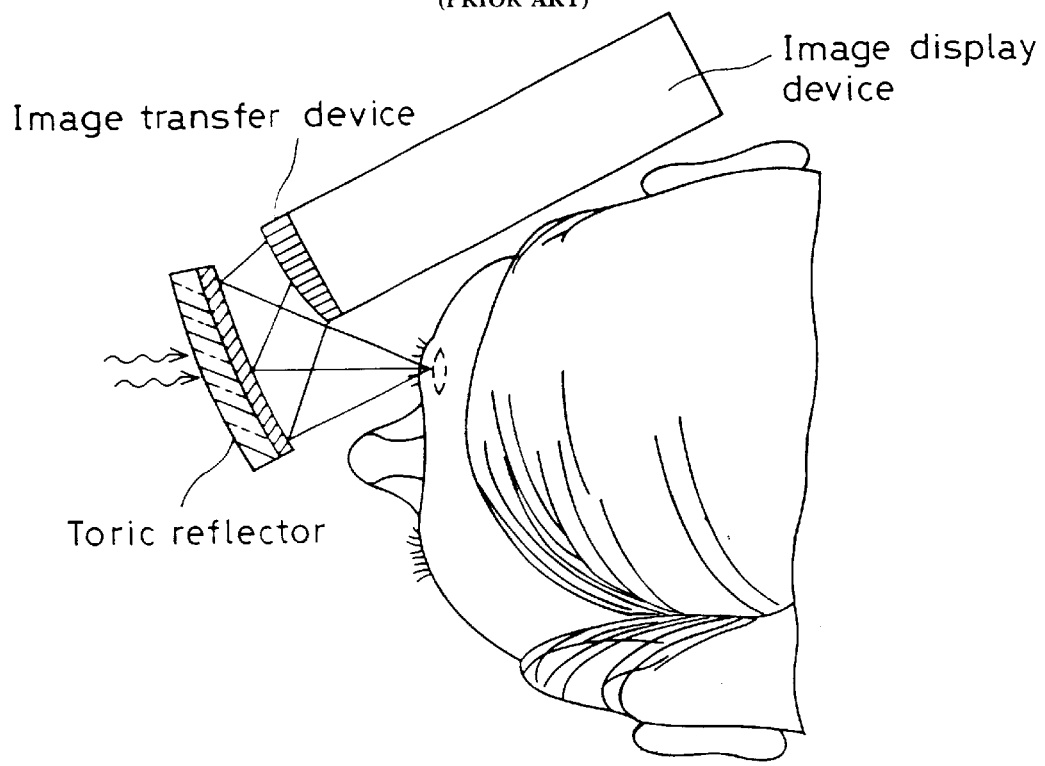
FIG. 21 shows the optical system of still another conventional image display apparatus.
Figure 22:
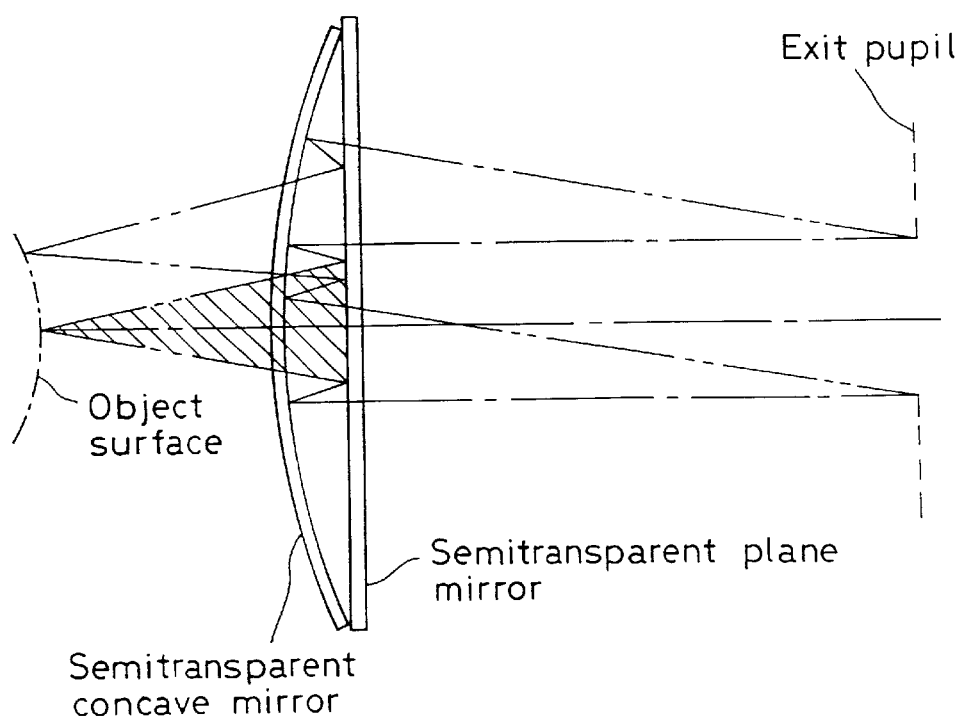
FIG. 22 shows the optical system of a further conventional image display apparatus.

Further, the optical system of the image display apparatus according to the present invention can be used as an image-forming optical system. For example, as shown in FIG. 16, the optical system may be used in a finder optical system $F_i$ of a compact camera $C_a$ in which a photographic optical system $O_b$ and the finder optical system $F_i$ are provided separately in parallel to each other. FIG. 17 shows the arrangement of an optical system in a case where the optical system according to the present invention is used as such an image-forming optical system. As illustrated in the figure, an optical system DS according to the present invention is disposed behind a front lens group GF and an aperture diaphragm D, thereby constituting an objective optical system $L_t$. An image that is formed by the objective optical system $L_t$ is erected by a Porro prism P, in which there are four reflections, provided at the observer side of the objective optical system $L_t$, thereby enabling an erect image to be observed through an ocular lens $O_c$.

As will be clear from the foregoing description, the present invention makes it possible to provide an image display apparatus which enables observation of a clear image at a wide field angle with substantially no reduction in the brightness of the observation image, and which is extremely small in size and light in weight and hence unlikely to cause the observer to be fatigued.

What I claim is:

1. In an image display apparatus comprising an image display device for displaying an image and an optical system for projecting the image displayed by said image display device and for leading the projected image to an observer's eyeball, the improvement wherein said optical system includes a first optical element having at least three surfaces, wherein a space formed by said at least three surfaces is filled with a medium having a refractive index larger than 1;

said at least three surfaces being defined as a first surface, a second surface, and a third surface, respectively, in an order in which light rays pass in backward ray tracing from said observer's eyeball to said image display device;

said first surface serving as both a refracting surface and an internally reflecting surface;

said second surface being a reflecting surface facing said first surface and decentered or tilted with respect to an observer's visual axis;

said third surface being a refracting surface closest to said image display device;

said optical system further including a second optical element provided between said observer's eyeball and said first optical element, said second optical element having at least two refracting surfaces, and wherein the following condition is satisfied:

$$0.01 < f_A/f_2 < 0.3 \tag{1}$$

where $f_2$ is a focal length of said second optical element, and $f_A$ is a focal length of said optical system.

2. An image display apparatus according to claim 1, which satisfies the following condition:

$$-2 < f_A/r_{22} < 0.5 \tag{2}$$

where $r_{22}$ is a radius of curvature of a first optical element-side refracting surface of said at least two refracting surfaces of said second optical element.

3. An image display apparatus according to claim 1 or 2, which satisfies the following condition:

$$-3 < r_{11}/r_{22} < 10 \tag{3}$$

where $r_{11}$ is a radius of curvature of the first surface of said first optical element, and $r_{22}$ is a radius of curvature of a first optical element-side refracting surface of said at least two refracting surfaces of said second optical element.

4. In an image display apparatus comprising an image display device for displaying an image and an optical system for projecting the image displayed by said image display device and for leading the projected image to an observer's eyeball, the improvement wherein said optical system includes a first optical element having at least three surfaces, wherein a space formed by said at least three surfaces is filled with a medium having a refractive index larger than 1;

said at least three surfaces being defined as a first surface, a second surface, and a third surface, respectively, in an order in which light rays pass in backward ray tracing from said observer's eyeball to said image display device;

said first surface serving as both a refracting surface and an internally reflecting surface;

said second surface facing said first surface and decentered or tilted with respect to an observer's visual axis;

said third surface being a refracting surface closest to said image display device;

said optical system further including a second optical element provided between said observer's eyeball and said first optical element, said second optical element having at least two refracting surfaces, wherein said second surface of said first optical element is a semitransparent reflecting surface that reflects a part of incident light and transmits a part of it, and wherein said first optical element and said second optical element are disposed in series in a direction of the observer's visual axis such that said second optical element lies on an eyeball side of said first optical element, and said first optical system lies on a side of said second optical element that is remote from said observer's eyeball, so that a bundle of light rays entering said optical system from an external scene passes successively through said first optical element and said second optical element to reach said observer's eyeball.

5. An image display apparatus according to claim 4, wherein a composite power of said first optical element and said second optical element is approximately zero with respect to light from the external scene.

6. An image display apparatus according to claim 4 or 5, which satisfies the following condition:

$$-2<r_{12}/r_{21}<4 \quad (4)$$

where $r_{12}$ is a radius of curvature of the second surface of said first optical element, and $r_{21}$ is a radius of curvature of an observer-side surface of said second optical element.

7. An image display apparatus according to claim 4 or 5, which satisfies the following condition:

$$0.01<f_A/f_2<0.3 \quad (5)$$

where $f_2$ is a focal length of said second optical element, and $f_A$ is a focal length of said optical system.

8. An image display apparatus according to claim 4 or 5, which satisfies the following condition:

$$-2<f_A/r_{22}<0.5 \quad (6)$$

where $f_A$ is a focal length of said optical system, and $r_{22}$ is a radius of curvature of a first optical element-side refracting surface of said at least two refracting surfaces of said second optical element.

9. An image display apparatus according to claim 4 or 5, which satisfies the following condition:

$$-3<r_{11}/r_{22}<10 \quad (7)$$

where $r_{11}$ is a radius of curvature of the first surface of said first optical element, and $r_{22}$ is a radius of curvature of a first optical element-side refracting surface of said at least two refracting surfaces of said second optical element.

10. An image display apparatus according to claim 4 or 5, wherein light-blocking means is disposed on a side of said first optical element that is remote from said observer's eyeball.

11. An image display apparatus according to claim 1, 2, 4 or 5, wherein said first optical element and said second optical element are apart from each other at at least a part of each of them.

12. An image display apparatus according to claim 1, 2, 4 or 5, which satisfies the following condition:

$$0.1<d_2/d_1<0.7 \quad (8)$$

where $d_1$ is a distance traversed by an axial principal ray emanating from a center of a display surface of said image display device and reaching a pupil of said observer's eyeball to pass through said first optical element, and $d_2$ is a distance traversed by the axial principal ray to pass through said second optical element.

13. An image display apparatus according to claim 1, 2, 4 or 5, which satisfies the following condition:

$$0.2<(d_1+d_2+k)/ER<1.2 \quad (9)$$

where $d_1$ is a distance from the first surface to the second surface of said first optical element that is traversed by an axial principal ray emanating from a center of a display surface of said image display device and reaching a pupil of said observer's eyeball; k is a distance between said first optical element and said second optical element traversed by the axial principal ray; $d_2$ is a distance traversed by the axial principal ray to pass through said second optical element; and ER is a distance from said observer's pupil to said second optical element traversed by the axial principal ray.

14. An image display apparatus according to claim 1, 2, 4 or 5, which satisfies the following condition:

$$-50°<\theta_2<0° \quad (10)$$

where $\theta_2$ is an incident angle at which an axial principal ray emanating from a center of a display surface of said image display device and reaching a pupil of said observer's eyeball is incident on said second surface of said first optical element in the backward ray tracing.

15. An image display apparatus according to claim 1, 2, 4 or 5, which satisfies the following condition:

$$-30°<\theta_2<-5° \quad (11)$$

where $\theta_2$ is an incident angle at which an axial principal ray emanating from a center of a display surface of said image display device and reaching a pupil of said observer's eyeball is incident on said second surface of said first optical element in the backward ray tracing.

16. An image display apparatus according to claim 1, 2, 4 or 5, which satisfies the following condition:

$$0°<\theta_1<50° \quad (12)$$

where $\theta_1$ is an incident angle at which an axial principal ray emanating from a center of a display surface of said image display device and reaching a pupil of said observer's eyeball is first incident on said first surface of said first optical element in the backward ray tracing.

17. An image display apparatus according to claim 1, 2, 4 or 5, which satisfies the following condition:

$$0°<\theta_1<40° \quad (13)$$

where $\theta_1$ is an incident angle at which an axial principal ray emanating from a center of a display surface of said image display device and reaching a pupil of said observer's eyeball is first incident on said first surface of said first optical element in the backward ray tracing.

18. An image display apparatus according to claim 1, 2, 4 or 5, which satisfies the following condition:

$$20°<\theta_3<70° \quad (14)$$

where $\theta_3$ is an incident angle at which an axial principal ray emanating from a center of a display surface of said image display device and reaching a pupil of said observer's eyeball is incident on said first surface of said first optical element for a second time in the backward ray tracing.

19. An image display apparatus according to claim 1, 2, 4 or 5, which satisfies the following condition:

$$30°<\theta_3<60° \quad (15)$$

where $\theta_3$ is an incident angle at which an axial principal ray emanating from a center of a display surface of said image display device and reaching a pupil of said observer's eyeball is incident on said first surface of said first optical element for a second time in the backward ray tracing.

20. An image display apparatus according to claim 1, 2, 4 or 5, which satisfies the following condition:

$$-10°<\theta_4<30° \quad (16)$$

where $\theta_4$ is an incident angle at which an axial principal ray emanating from a center of a display surface of said image display device and reaching a pupil of said observer's eyeball is incident on said third surface of said first optical element in the backward ray tracing.

21. An image display apparatus according to claim 1, 2, 4 or 5, which satisfies the following condition:

$$-40° < \theta_i < 40° \quad (17)$$

where $\theta_i$ is an incident angle at which an axial principal ray emanating from a center of a display surface of said image display device and reaching a pupil of said observer's eyeball is incident on the display surface of said image display device in the backward ray tracing.

22. An image display apparatus according to claim 1, 2, 4 or 5, which satisfies the following condition:

$$-20° < \theta_i < 20° \quad (18)$$

where $\theta_i$ is an incident angle at which an axial principal ray emanating from a center of a display surface of said image display device and reaching a pupil of said observer's eyeball is incident on the display surface of said image display device in the backward ray tracing.

23. An image display apparatus according to claim 1, 2, 4 or 5, which satisfies the following condition:

$$-20° < \theta_a < 30° \quad (19)$$

where $\theta_a$ is an incident angle at which an axial principal ray emanating from a center of a display surface of said image display device and reaching a pupil of said observer's eyeball is incident on an observer-side surface of said second optical element in the backward ray tracing.

24. An image display apparatus according to claim 1, 2, 4 or 5, which satisfies the following condition:

$$-20° < \theta_b < 50° \quad (20)$$

where $\theta_b$ is an incident angle at which an axial principal ray emanating from a center of a display surface of said image display device and reaching a pupil of said observer's eyeball is incident on a first optical element-side surface of said second optical element in the backward ray tracing.

25. An image display apparatus according to claim 1, 2, 4 or 5, which satisfies the following condition:

$$1.45 < N_d < 2.0 \quad (21)$$

where $N_d$ is a refractive index for the spectral d-line of said medium having a refractive index larger than 1.

26. An image display apparatus according to claim 1, 2, 4 or 5, which satisfies the following condition:

$$1.5 < N_d < 2.0 \quad (22)$$

where $N_d$ is a refractive index for the spectral d-line of said medium having a refractive index larger than 1.

27. An image display apparatus according to claim 1, 2, 4 or 5, wherein internal reflection at said first surface is total reflection.

28. An image display apparatus according to claim 1, 2, 4 or 5, wherein said second surface is a reflecting surface which is concave toward said first surface.

29. An image display apparatus according to claim 1, 2, 4 or 5, wherein said first surface functions as both a transmitting surface and a reflecting surface and is convex toward said second surface.

30. An image display apparatus according to claim 1, 2, 4 or 5, wherein at least one surface of said first optical element is a plane surface which functions as both a transmitting surface and a reflecting surface.

31. An image display apparatus according to claim 1, 2, 4 or 5, wherein at least a part of an internally reflecting region of said first surface is provided with a reflection coating.

32. An image display apparatus according to claim 1, 2, 4 or 5, wherein at least one of surfaces constituting said optical system is an aspherical surface.

33. An image display apparatus according to claim 32, wherein at least one of surfaces constituting said optical system is an anamorphic surface.

34. An image display apparatus according to claim 32, wherein at least one of surfaces constituting said optical system is a three-dimensional surface.

35. An image display apparatus according to claim 1, 2, 4 or 5, wherein a display surface of said image display device is tilted with respect to an axial principal ray emanating from a center of the display surface of said image display device and reaching a pupil of said observer's eyeball.

36. An image display apparatus according to claim 1, 2, 4 or 5, which has means for positioning both said image display device and said optical system with respect to an observer's head.

37. An image display apparatus according to claim 1, 2, 4 or 5, which has means for supporting both said image display device and said optical system with respect to an observer's head such that said apparatus can be mounted on said observer's head.

38. An image display apparatus according to claim 1, 2, 4 or 5, which has means for supporting at least a pair of said image display apparatuses at a predetermined spacing.

39. An image display apparatus according to claim 1, 2, 4 or 5, wherein said optical system is used as an image-forming optical system.

* * * * *